US010498437B2

(12) United States Patent
Islam et al.

(10) Patent No.: US 10,498,437 B2
(45) Date of Patent: Dec. 3, 2019

(54) CONVEYING HYPOTHESES THROUGH RESOURCE SELECTION OF SYNCHRONIZATION AND BROADCAST CHANNELS

(71) Applicant: QUALCOMM Incorporated, San Diego, CA (US)

(72) Inventors: Muhammad Nazmul Islam, Edison, NJ (US); Navid Abedini, Raritan, NJ (US); Tao Luo, San Diego, CA (US); Sundar Subramanian, Bridgewater, NJ (US); Juergen Cezanne, Ocean Township, NJ (US); Ashwin Sampath, Skillman, NJ (US); Alexei Yurievitch Gorokhov, San Diego, CA (US); Junyi Li, Chester, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/608,887

(22) Filed: May 30, 2017

(65) Prior Publication Data

US 2017/0353234 A1 Dec. 7, 2017

Related U.S. Application Data

(60) Provisional application No. 62/410,073, filed on Oct. 19, 2016, provisional application No. 62/401,801, (Continued)

(51) Int. Cl.
*H04B 7/26* (2006.01)
*H04W 56/00* (2009.01)
(Continued)

(52) U.S. Cl.
CPC ......... *H04B 7/2681* (2013.01); *H04L 1/0625* (2013.01); *H04L 5/0094* (2013.01);
(Continued)

(58) Field of Classification Search
CPC . H04L 1/0625; H04L 27/2601; H04L 25/022; H04L 27/2605; H04B 7/2681; H04B 7/04
See application file for complete search history.

(56) References Cited

U.S. PATENT DOCUMENTS

| 5,327,575 A | 7/1994 | Menich et al. |
| 5,686,926 A | 11/1997 | Kijima et al. |
| | (Continued) | |

FOREIGN PATENT DOCUMENTS

| EP | 2916600 A1 | 9/2015 |
| EP | 3065485 A1 | 9/2016 |
| | (Continued) | |

OTHER PUBLICATIONS

International Search Report and Written Opinion—PCT/US2017/035289—ISA/EPO—dated Dec. 1, 2017.
(Continued)

*Primary Examiner* — Jean B Corrielus
(74) *Attorney, Agent, or Firm* — Clint R. Morin; Arent Fox

(57) ABSTRACT

According to an aspect of the disclosure, a base station may convey the parameter information to the UE based on selection of particular resources to be used for transmission of synchronization signals, where the selected resources correspond to the particular parameter information. The UE may blindly detect the synchronization signals on various candidate resources and determine the parameter information based on the resources where the synchronization signals are detected. The apparatus may be a base station. In an aspect, the base station determines parameter information of one or more parameters. The base station selects, based on the parameter information, synchronization resources from a plurality of candidate resources for transmission of one or more synchronization signals, where the selected synchronization resources correspond to the parameter information. The base station transmits the one or more synchronization signals using the selected synchronization resources.

68 Claims, 19 Drawing Sheets

Related U.S. Application Data filed on Sep. 29, 2016, provisional application No. 62/350,171, filed on Jun. 14, 2016, provisional application No. 62/344,381, filed on Jun. 1, 2016.

(51) Int. Cl.
*H04L 1/06* (2006.01)
*H04L 27/26* (2006.01)
*H04L 5/00* (2006.01)
*H04B 7/04* (2017.01)
*H04L 25/02* (2006.01)
*H04L 1/00* (2006.01)

(52) U.S. Cl.
CPC ...... *H04L 27/2601* (2013.01); *H04L 27/2613* (2013.01); *H04L 27/2692* (2013.01); *H04W 56/0015* (2013.01); *H04B 7/04* (2013.01); *H04L 1/0003* (2013.01); *H04L 1/0009* (2013.01); *H04L 1/0026* (2013.01); *H04L 5/005* (2013.01); *H04L 5/0051* (2013.01); *H04L 25/022* (2013.01); *H04L 27/2605* (2013.01)

(56) References Cited

U.S. PATENT DOCUMENTS

| | | |
|---|---|---|
| 7,969,964 B2 | 6/2011 | Kim et al. |
| 8,638,775 B2 | 1/2014 | Hall |
| 8,897,725 B2 | 11/2014 | Prasad et al. |
| 8,964,689 B2 | 2/2015 | Ji et al. |
| 8,982,848 B2 | 3/2015 | Ko et al. |
| 2006/0052114 A1 | 3/2006 | Cuffaro |
| 2006/0250937 A1 | 11/2006 | Wang et al. |
| 2007/0004465 A1 | 1/2007 | Papasakellariou et al. |
| 2007/0201398 A1 | 8/2007 | Yang et al. |
| 2008/0205351 A1 | 8/2008 | Lindoff et al. |
| 2008/0274742 A1 | 11/2008 | Bi |
| 2009/0097447 A1 | 4/2009 | Han et al. |
| 2010/0296429 A1 | 11/2010 | Han et al. |
| 2013/0044695 A1 | 2/2013 | Xu et al. |
| 2013/0084879 A1 | 4/2013 | Abe et al. |
| 2013/0272294 A1 | 10/2013 | Mildh et al. |
| 2014/0126498 A1 | 5/2014 | Koorapaty et al. |
| 2015/0036764 A1 | 2/2015 | Oh et al. |
| 2015/0049741 A1 | 2/2015 | Chen et al. |
| 2015/0085833 A1 | 3/2015 | Han et al. |
| 2015/0109943 A1 | 4/2015 | Sahin et al. |
| 2015/0109974 A1* | 4/2015 | Zeng ................ H04W 56/0015 370/280 |
| 2015/0131750 A1 | 5/2015 | Xue et al. |
| 2015/0172940 A1 | 6/2015 | Nagata et al. |
| 2015/0173051 A1 | 6/2015 | Nagata et al. |
| 2015/0236774 A1 | 8/2015 | Son et al. |
| 2015/0319724 A1 | 11/2015 | Chae et al. |
| 2015/0319761 A1 | 11/2015 | Nagata et al. |
| 2015/0358801 A1* | 12/2015 | Seo ........................ H04W 8/005 370/329 |
| 2016/0050675 A1 | 2/2016 | Tanaka |
| 2016/0127919 A1 | 5/2016 | Hui et al. |
| 2016/0134402 A1* | 5/2016 | Park .................... H04L 27/2607 370/329 |
| 2016/0150431 A1 | 5/2016 | Zhang et al. |
| 2016/0212594 A1* | 7/2016 | Morita .................. H04W 72/10 |
| 2016/0277225 A1 | 9/2016 | Frenne et al. |
| 2016/0323757 A1 | 11/2016 | Braun et al. |
| 2016/0352551 A1* | 12/2016 | Zhang ................ H04L 27/2602 |
| 2016/0374038 A1* | 12/2016 | Wang .................... H04L 5/0014 |
| 2017/0094547 A1 | 3/2017 | Yum et al. |
| 2017/0127444 A1 | 5/2017 | Goto et al. |
| 2017/0201968 A1 | 7/2017 | Nam et al. |
| 2017/0353254 A1 | 12/2017 | Islam et al. |
| 2017/0353255 A1 | 12/2017 | Islam et al. |
| 2017/0353256 A1 | 12/2017 | Islam et al. |
| 2017/0353257 A1 | 12/2017 | Islam et al. |
| 2018/0054289 A1 | 2/2018 | Kim et al. |
| 2018/0084551 A1* | 3/2018 | Shin .................. H04W 72/0453 |
| 2018/0213562 A1 | 7/2018 | Cierny et al. |
| 2018/0262313 A1 | 9/2018 | Nam et al. |
| 2018/0323855 A1 | 11/2018 | Noh et al. |
| 2018/0337757 A1 | 11/2018 | Noh et al. |
| 2019/0028984 A1 | 1/2019 | Lee et al. |
| 2019/0037609 A1 | 1/2019 | Harada et al. |

FOREIGN PATENT DOCUMENTS

| | | |
|---|---|---|
| WO | 2010015102 A1 | 2/2010 |
| WO | 2010050731 A2 | 5/2010 |
| WO | 2010094299 A1 | 8/2010 |
| WO | 2013166961 A1 | 11/2013 |
| WO | 2015064679 A1 | 5/2015 |
| WO | 2015080649 A1 | 6/2015 |
| WO | 2017018966 A1 | 2/2017 |
| WO | 2017044144 A1 | 3/2017 |
| WO | 2018201491 A1 | 11/2018 |

OTHER PUBLICATIONS

Samsung: "Narrowband IoT—Broadcast Channel Design", 3GPP Draft; R1-155511, 3rd Generation Partnership Project (3GPP), Mobile Competence Centre; 650, Route Des Lucioles; F-06921 Sophia-Anti Polls Cedex; France, vol. RAN WG1, No. Malmo, Sweden; Oct. 4, 2015, XP051002403, Retrieved from the Internet: URL:http://www.3gpp.org/ftp/Meetings_3GPP_SYNC/RAN1/Docs/ [retrieved on Oct. 4, 2015], 5 pages.

Intel Corporation: "Details on Small Cell Discovery Signal", 3GPP Draft; R1-142028, 3rd Generation Partnership Project (3GPP), Mobile Competence Centre ; 650, Route Des Lucioles ; F-06921 Sophia-Antipolis Cedex; France, vol. RAN WG1, no. Seoul, Korea; May 19, 2014, May 23, 2014, May 18, 2014 (May 18, 2014), XP050789148, Retrieved from the Internet: URL: http://www.3gpp.org/ftp/Meetings_3GPP_SVNC/RAN1/RAN1/Docs/ [retrieved on May 18, 2014].

LG Electronics et al., "WF on Supporting Different Numerologies in a NR Carrier", 3GPP TSG RAN WG1 Meeting #85, R1-165837, May 30, 2016, XP051112005, Retrieved from the Internet: URL:http://www.3gpp.org/ftp/tsg ran/WG1_RL1/TSGR1_85/Docs/, 3 pages.

Qualcomm Incorporated: "NB-PSS and NB-SSS Design", 3GPP Draft; R1-160105 NB-PSS and NB-SSS Design, 3rd Generation Partnership Project (3GPP), Mobile Competence Centre ; 650, Route Des Lucioles ; F-06921 Sophia-Antipolis Cedex ; France vol. RAN WG1, no. Budapest, HU; Jan. 18, 2016-Jan. 20, 2016, Jan. 17, 2016 (Jan. 17, 2017), pp. 1-11, XP051053425, Retrieved from the Internet: URL: http://www.3gpp.org/ftp/Meetings_3GPP_SYNC/RAN1/Docs/ [retrieved on Jan. 17, 2016].

Sharp: "Synchronization Signal Design for NB-IoT", 3GPP TSG RAN WG1 Meeting #83, R1-157119, Nov. 15, 2015, XP051040013, Retrieved from the Internet: URL:http://www.3gpp.org/ftp/Meetings_3GPP_SYNC/RAN1/Docs/, 4 pages.

ZTE et al., "Performance Evaluation of Numerology Candidates", 3GPP TSG RAN WG1 Meeting #85, R1-164272, May 14, 2016, XP051090020, Retrieved from the Internet: URL:http://www.3gpp.org/ftp/tsg_ran/WG1_RL1/TSGR1_85/Docs/, 7 pages.

NTT DoCoMo, et al., "Multiplexing Method of Shared Control Channel in Uplink Single-Carrier FDMA Radio Access," TSG RAN WG1 #42bis, Document #R1-051143 (Original R1-050591), pp. 1-9, XP002450609, Oct. 10-14, 2005.

NTT DoCoMo: "Multiplexing Method of SCH for E-UTRA Downlink", 3GPP TSG-RAN WG1#47, R1-063303, Institute for Infocomm Research, Nov. 6, 2006, p. 1-9.

Ericsson LM., et al., "Narrowband LTE—Concept Description," 3GPP Draft; R1-154659, 3rd Generation Partnership Project (3GPP), Mobile Competence Centre; 650, Route Des Lucioles; F-06921 Sophia-Antipolis Cedex; France vol. RAN WG1, No. Beijing, China; Aug. 24, 2015-Aug. 28, 2015 Aug. 23, 2015 (Aug. 23, 2015), XP051001893, Retrieved from the Internet: URL:http://www.3gpp.org/ftp/Meetings_3GPP_SYNC/RAN1/Docs/ [retrieved on Aug. 23, 2015], 9 pages.

(56) References Cited

OTHER PUBLICATIONS

LG Electronics: "Discussion on SS Block Time Index Indication", 3GPP TSG RAN WG1 Meeting #89, R1-1707589, Hangzhou, P.R. China May 15-19, 2017, 3 pages.
Mediatek Inc: "Multiplexing and Resource Allocation of NB-PDSCH in NB-IoT", 3GPP TSG RAN WG1 Meeting #84, R1-160829, St Julian's, Malta, Feb. 15-19, 2016, 5 pages.
Samsung et al., "WF on SS Block Index Indication", 3GPP TSG RAN WG1 Meeting RAN1#89, R1-1709490, Hangzhou, P.R. China May 15-19, 2017, 4 pages.

* cited by examiner

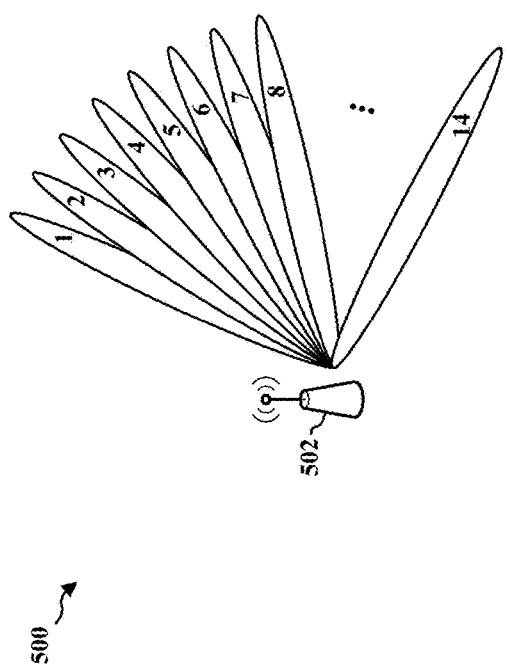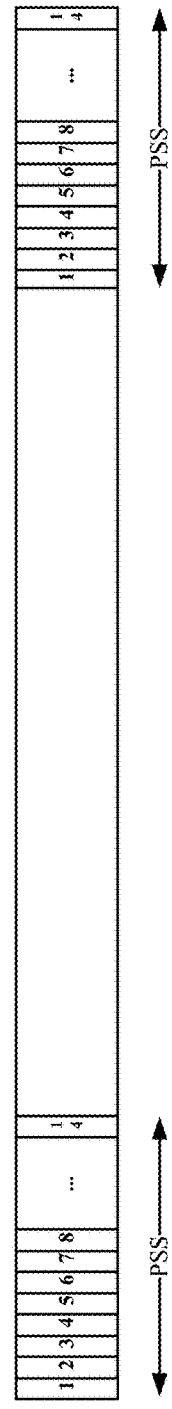
FIG. 5A
FIG. 5B

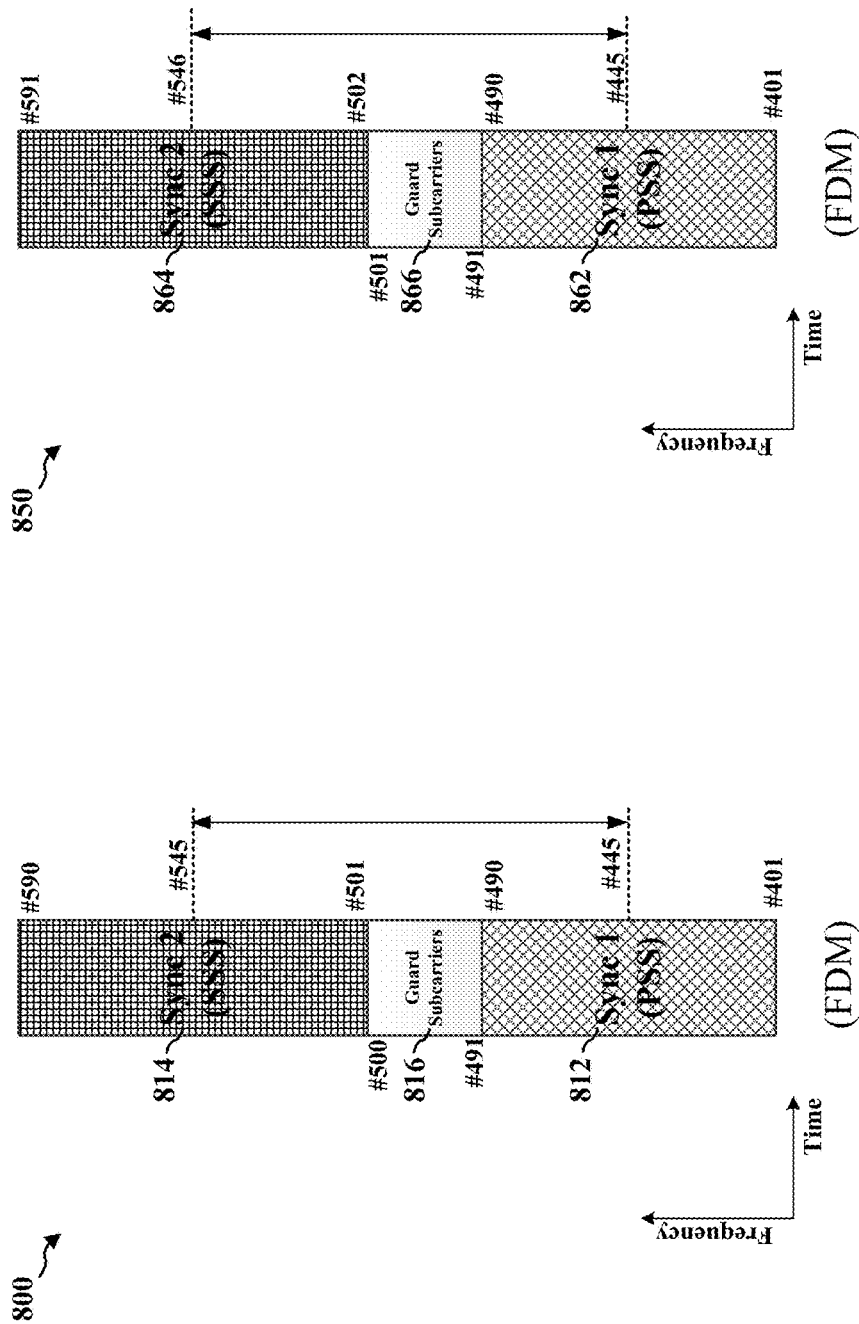

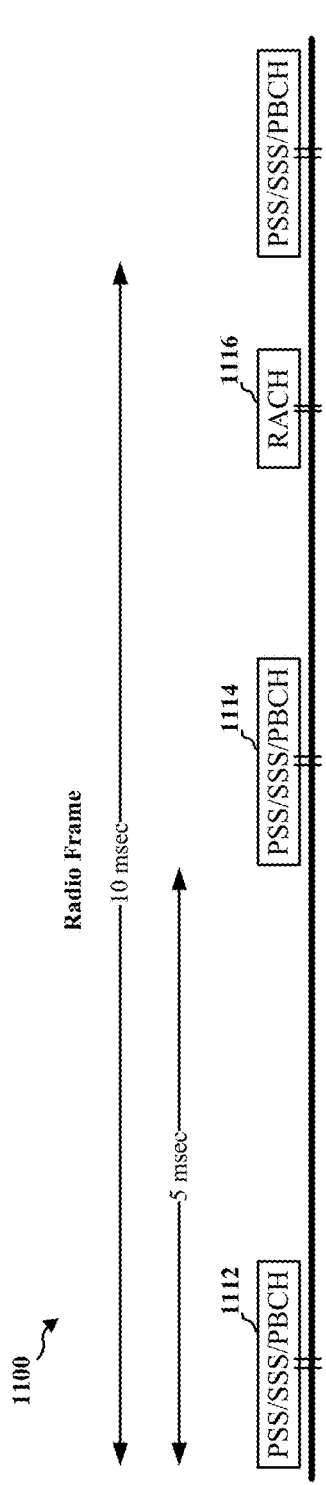
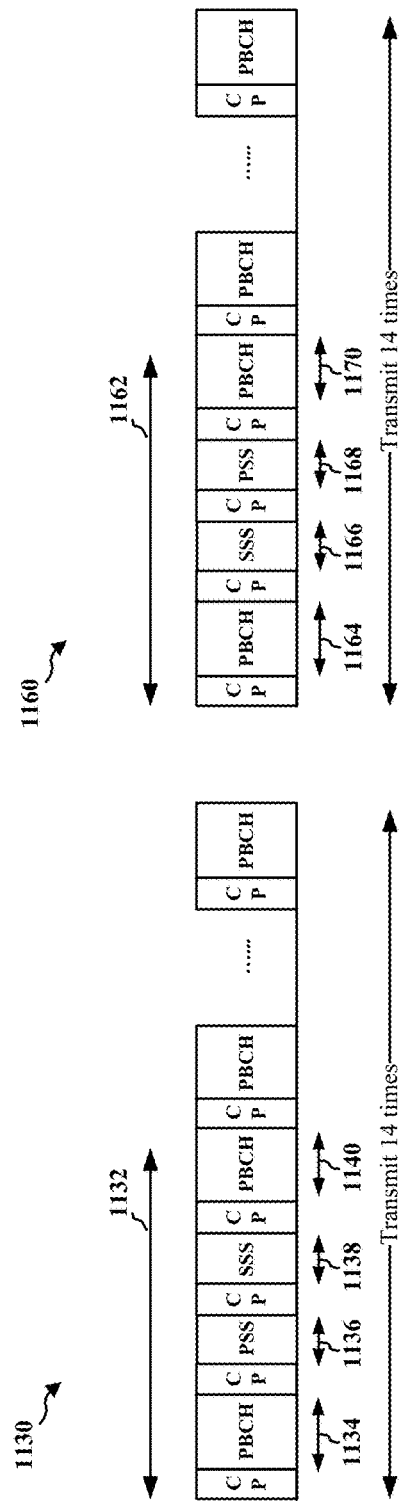
FIG. 11A
FIG. 11B
FIG. 11C

CONVEYING HYPOTHESES THROUGH RESOURCE SELECTION OF SYNCHRONIZATION AND BROADCAST CHANNELS

CROSS-REFERENCE TO RELATED APPLICATION(S)

This application claims the benefit of U.S. Provisional Application Ser. No. 62/410,073, entitled "CONVEYING HYPOTHESES THROUGH RESOURCE SELECTION OF SYNCHRONIZATION AND BROADCAST CHANNELS" and filed on Oct. 19, 2016, U.S. Provisional Application Ser. No. 62/344,381, entitled "TIME DIVISION MULTIPLEXING OF SYNCHRONIZATION CHANNELS" and filed on Jun. 1, 2016, U.S. Provisional Application Ser. No. 62/350,171, entitled "TIME DIVISION MULTIPLEXING OF SYNCHRONIZATION CHANNELS" and filed on Jun. 14, 2016, and U.S. Provisional Application Ser. No. 62/401,801, entitled "TIME DIVISION MULTIPLEXING OF SYNCHRONIZATION CHANNELS" and filed on Sep. 29, 2016, which are expressly incorporated by reference herein in their entirety.

BACKGROUND

Field

The present disclosure relates generally to communication systems, and more particularly, to indication of parameters by a base station.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A base station may transmit various types of information to a user equipment. For example, the base station may transmit information about various parameters to a user equipment. Hence, various approaches used by a base station to convey parameter information to a user equipment have been under development.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A base station may convey information about various parameters (e.g., system parameters) to a UE. The base station may convey the parameter information (parameter value) for each parameter to the UE according to various approaches. One approach to convey the parameter information to the UE may be based on selection of particular resources used for transmission of synchronization signals, where the selected resources correspond to the particular parameter information. The UE may determine the particular parameter information by detecting the synchronization signals in the resources selected by the base station, and determining the parameter information based on the resources on which the UE detects the synchronization signals.

In an aspect of the disclosure, a method, a computer-readable medium, and an apparatus are provided. The apparatus may be a base station. The base station determines parameter information of one or more parameters. The base station selects, based on the parameter information, synchronization resources from a plurality of candidate resources for transmission of one or more synchronization signals, where the selected synchronization resources correspond to the parameter information. The base station transmits the one or more synchronization signals using the selected synchronization resources.

In an aspect, the apparatus may be a base station. The base station may include means for determining parameter information of one or more parameters. The base station may further include means for selecting, based on the parameter information, synchronization resources from a plurality of candidate resources for transmission of one or more synchronization signals, where the selected synchronization resources correspond to the parameter information. The base station may further include means for transmitting the one or more synchronization signals using the selected synchronization resources.

In an aspect, the apparatus may be a base station including a memory and at least one processor coupled to the memory. The at least one processor may be configured to: determine parameter information of one or more parameters, select, based on the parameter information, synchronization resources from a plurality of candidate resources for transmission of one or more synchronization signals, where the selected synchronization resources correspond to the parameter information, and transmit the one or more synchronization signals using the selected synchronization resources.

In an aspect, a computer-readable medium storing computer executable code for a base station may include code to: determine parameter information of one or more parameters, select, based on the parameter information, synchronization resources from a plurality of candidate resources for transmission of one or more synchronization signals, where the selected synchronization resources correspond to the parameter information, and transmit the one or more synchronization signals using the selected synchronization resources.

In an aspect of the disclosure, a method, a computer-readable medium, and an apparatus are provided. The apparatus may be a base station. The base station determines a CP duration parameter. The base station transmits the CP duration parameter via a PBCH signal.

In an aspect, the apparatus may be a base station. The base station may include means for determining a CP duration parameter. The base station may further include means for transmitting the CP duration parameter via a PBCH signal.

In an aspect, the apparatus may be a base station including a memory and at least one processor coupled to the memory. The at least one processor may be configured to: determine a CP duration parameter, and transmit the CP duration parameter via a PBCH signal.

In an aspect, a computer-readable medium storing computer executable code for a base station may include code to: determine a CP duration parameter, and transmit the CP duration parameter via a PBCH signal.

In an aspect of the disclosure, a method, a computer-readable medium, and an apparatus are provided. The apparatus may be a UE. The UE detects one or more synchronization signals in a plurality of candidate resources. The UE determines synchronization resources on which the one or more synchronization signals are detected in the plurality of candidate resources. The UE determines parameter information of one or more parameters based on the determined synchronization resources, where the determined synchronization resources correspond to the parameter information.

In an aspect, the apparatus may be a UE. The UE may include means for. The UE may further include means for detecting one or more synchronization signals in a plurality of candidate resources. The UE may further include means for determining synchronization resources on which the one or more synchronization signals are detected in the plurality of candidate resources. The UE may further include means for determining parameter information of one or more parameters based on the determined synchronization resources, where the determined synchronization resources correspond to the parameter information.

In an aspect, the apparatus may be a UE including a memory and at least one processor coupled to the memory. The at least one processor may be configured to: detect one or more synchronization signals in a plurality of candidate resources, determine synchronization resources on which the one or more synchronization signals are detected in the plurality of candidate resources, and determine parameter information of one or more parameters based on the determined synchronization resources, where the determined synchronization resources correspond to the parameter information.

In an aspect, a computer-readable medium storing computer executable code for a UE may include code to: detect one or more synchronization signals in a plurality of candidate resources, determine synchronization resources on which the one or more synchronization signals are detected in the plurality of candidate resources, and determine parameter information of one or more parameters based on the determined synchronization resources, where the determined synchronization resources correspond to the parameter information.

In an aspect of the disclosure, a method, a computer-readable medium, and an apparatus are provided. The apparatus may be a UE. The UE receives a PBCH signal. The UE determines a CP duration parameter based on the PBCH signal.

In an aspect, the apparatus may be a UE. The UE may include means for receiving a PBCH signal. The UE may further include means for determining a CP duration parameter based on the PBCH signal.

In an aspect, the apparatus may be a UE including a memory and at least one processor coupled to the memory. The at least one processor may be configured to: receive a PBCH signal, and determine a CP duration parameter based on the PBCH signal.

In an aspect, a computer-readable medium storing computer executable code for a UE may include code to: receive a PBCH signal, and determine a CP duration parameter based on the PBCH signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is an example diagram illustrating a base station sweeping in multiple directions.

FIG. 5B is an example diagram illustrating resource usage for the base station of FIG. 5A.

FIGS. 8A and 8B are example diagrams illustrating indication of parameter information based on guard subcarriers and/or resource locations, according to an aspect of the disclosure.

FIGS. 11A, 11B, and 11C are example diagrams illustrating transmission of synchronization signals, according to an aspect of the disclosure.

DETAILED DESCRIPTION

Figure 1:
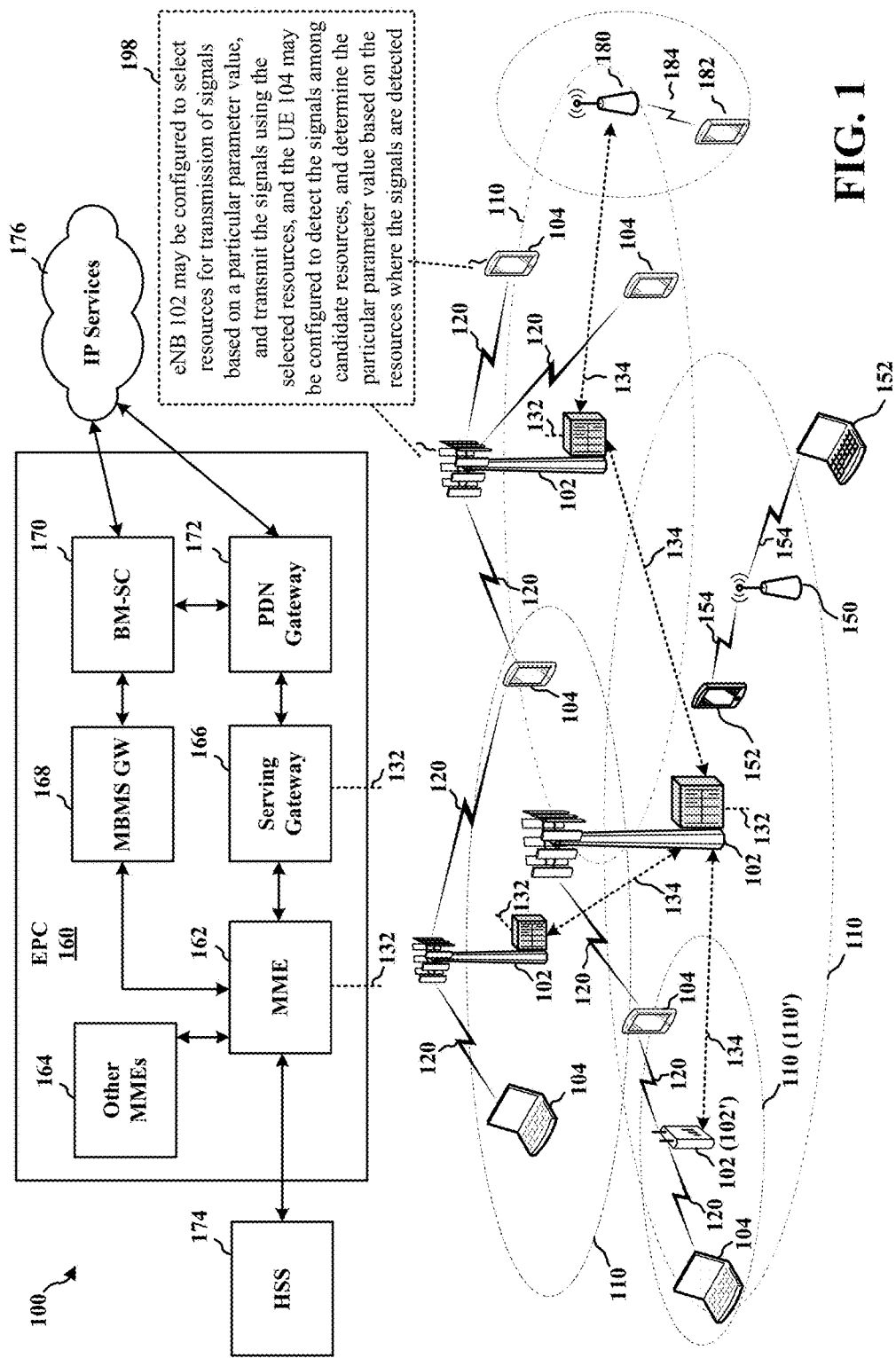
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to select resources for transmission of signals based on a particular parameter value, and transmit the signals using the selected resources, and the UE 104 may be configured to detect the signals among candidate resources, and determine the particular parameter value based on the resources where the signals are detected (198).

Figure 2:
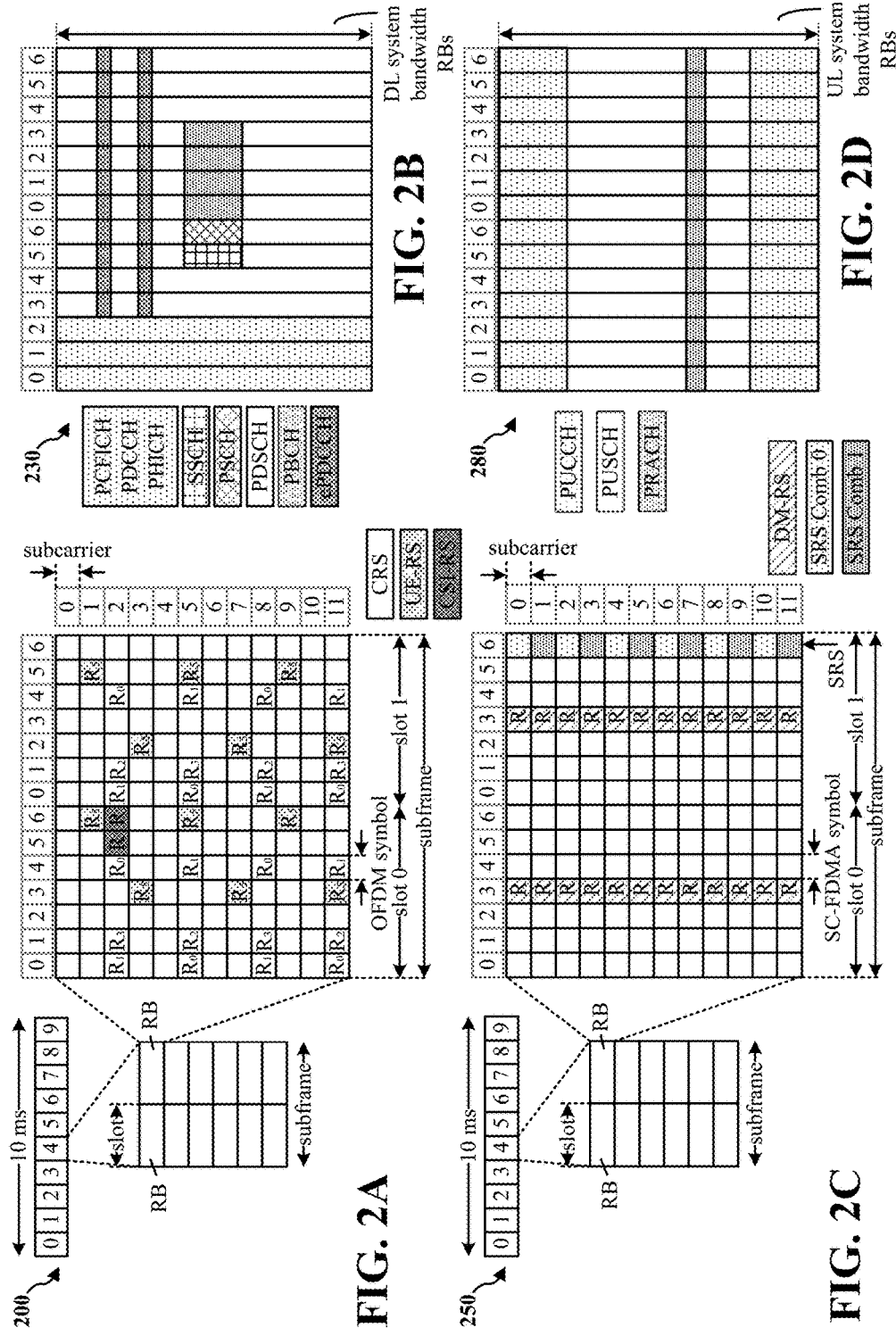
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
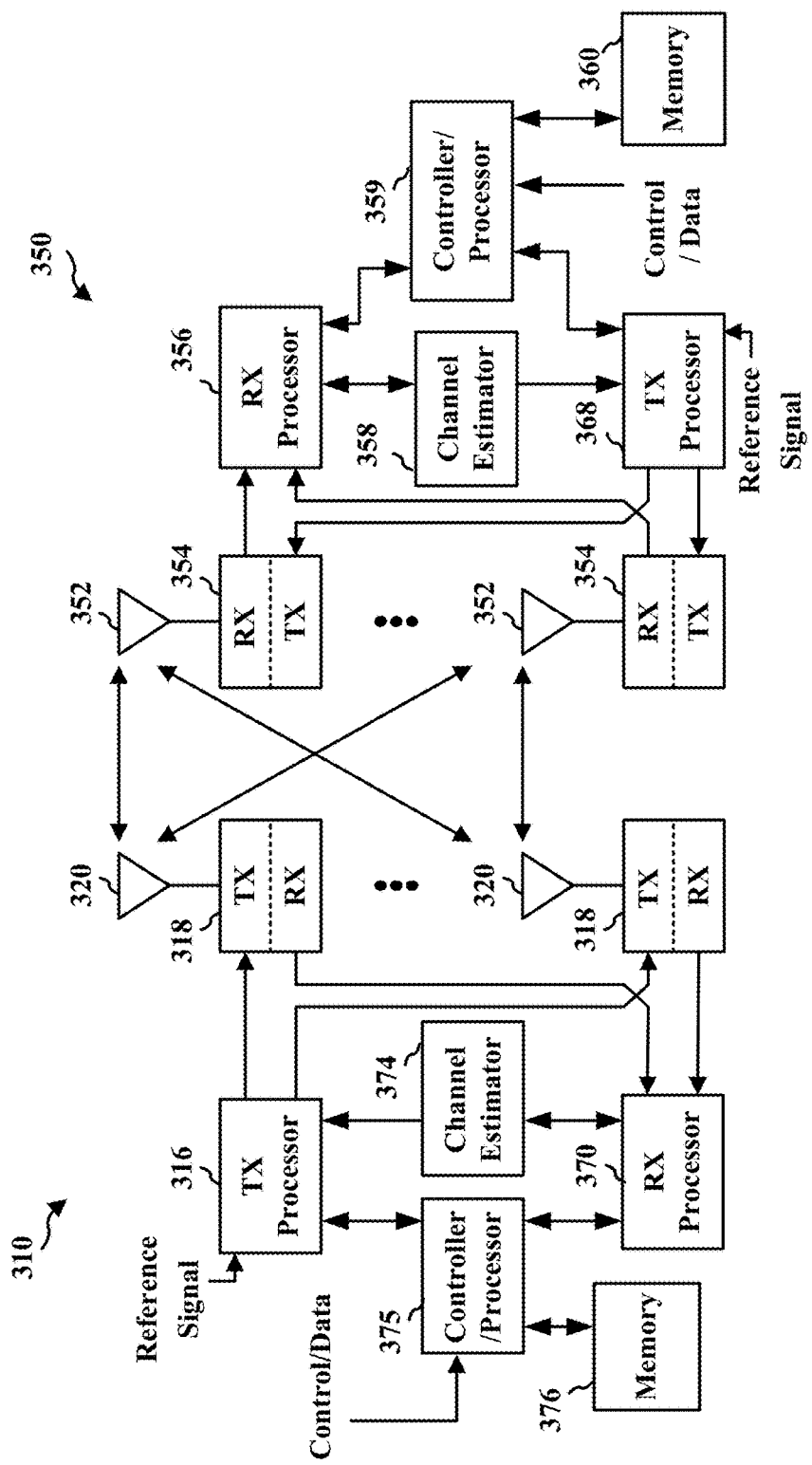
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
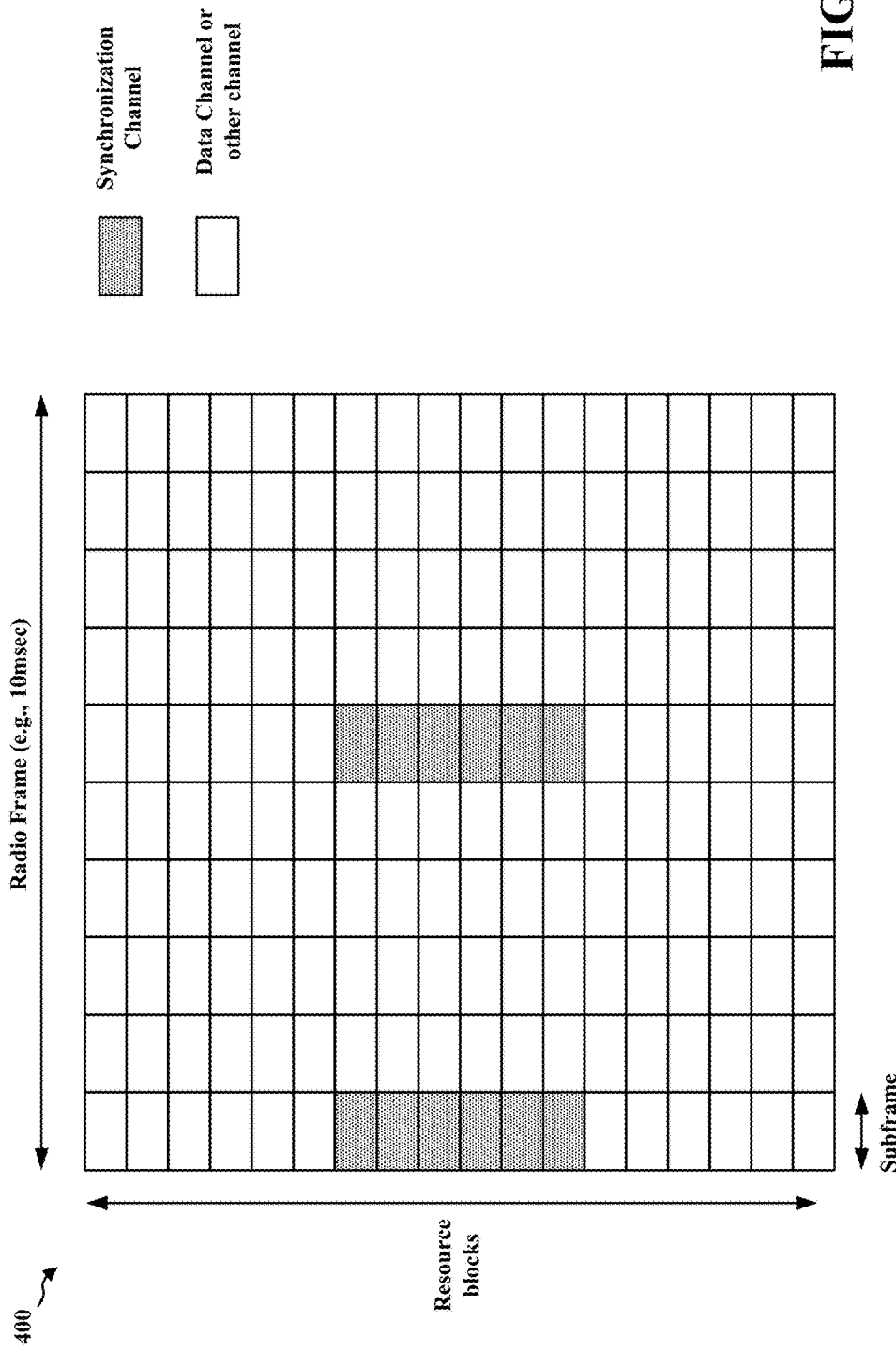
FIG. 4 is an example diagram illustrating synchronization channels over a radio frame.

Synchronization signaling in LTE may occur, for example, twice during a radio frame, and be transmitted on multiple subcarriers. FIG. 4 is an example diagram 400 illustrating synchronization channels spread over a radio frame. As shown in FIG. 4, the synchronization channels for synchronization signaling may be allocated every five subframes, spread over six subcarriers. Synchronization signals such as a primary synchronization signal (PSS), a secondary synchronization signal (SSS), and a physical broadcast channel (PBCH) signal may be transmitted in the subframes carrying the synchronization channels.

A base station may use beam forming to transmit signals in a particular direction. For example, in an mmW system that utilize a high carrier frequency (e.g., 28 GHz), path loss may be high and there may be additional non-line-of-sight loss (e.g., diffraction, reflection, absorption, etc.). For example, the carrier frequency for mmW communication may be 10 times higher than a carrier frequency for other types of wireless communication. In such an example, the mmW system may experience a path loss that is approximately 20 dB higher than other types of wireless communication cases at lower frequencies. To mitigate the path loss and/or additional non-line-of-sight loss in mmW systems, a base station may perform transmissions in a directional manner, where the transmissions are beam-formed to steer the transmissions of the beams in different directions.

If the carrier frequency for wireless communication is high, the wavelength is short which may allow a higher number of antennas to be implemented within a given antenna array length than can be implemented when a lower carrier frequency is used. Therefore, in the mmW system (using a high carrier frequency), a higher number of antennas may be used in a base station and/or a UE. For example, the BS may 128 or 256 antennas and the UE may have 8, 16 or 24 antennas. With the high number of antennas, a beam-forming technique may be used to digitally change the direction of the beam by applying different phases for different antennas. Because beam-forming in a mmW system provides a narrow beam for increased gain, the base station may transmit the narrow beam in different directions by beam-forming in different directions. Thus, the base station should also transmit synchronization signals in different directions using beam-forming in a sweeping manner.

If there are multiple antenna ports (multiple sets of antennas) in the base station, the base station may transmit multiple beams per symbol. For example, the base station may sweep in multiple directions using multiple antenna ports in a cell specific manner. Each antenna port includes a set of antennas. For example, an antenna port including a set of antennas (e.g., 64 antennas) may transmit one beam in one direction, and another antenna port including another set of antennas may transmit another beam in another direction. Thus, multiple antenna ports may transmit multiple beams, each in a different direction. FIG. 5A is an example diagram 500 illustrating a base station sweeping in multiple directions. The base station 502 in FIG. 5 has fourteen antenna ports, and thus is capable of transmitting fourteen beams (beam 1-beam 14) in fourteen different directions (sweeping in fourteen different directions). FIG. 5B is an example diagram 550 illustrating resource usage for the base station of FIG. 5A. As illustrated in FIG. 5B, a synchronization signal such as a PSS may be transmitted in fourteen directions via fourteen different beams using fourteen different resources, respectively (e.g., fourteen different symbols). The UE may receive the synchronization signal in one of the directions that corresponds to the position of the UE. Therefore, the synchronization signal cannot be frequency-division multiplexed with data signals. On the other hand, different synchronization signals such as a PSS, a SSS, an extended synchronization Signal (ESS), a PBCH signal, and beam reference signal (BRS) may be frequency-division multiplexed among themselves (e.g., by the base station), and may be transmitted in each of different directions of the beam-forming within each symbol. For example, for each direction, the synchronization signals may be frequency-division multiplexed, but the synchronization signals in one direction may not be frequency-division multiplexed with synchronization signals in another direction.

Figure 6:
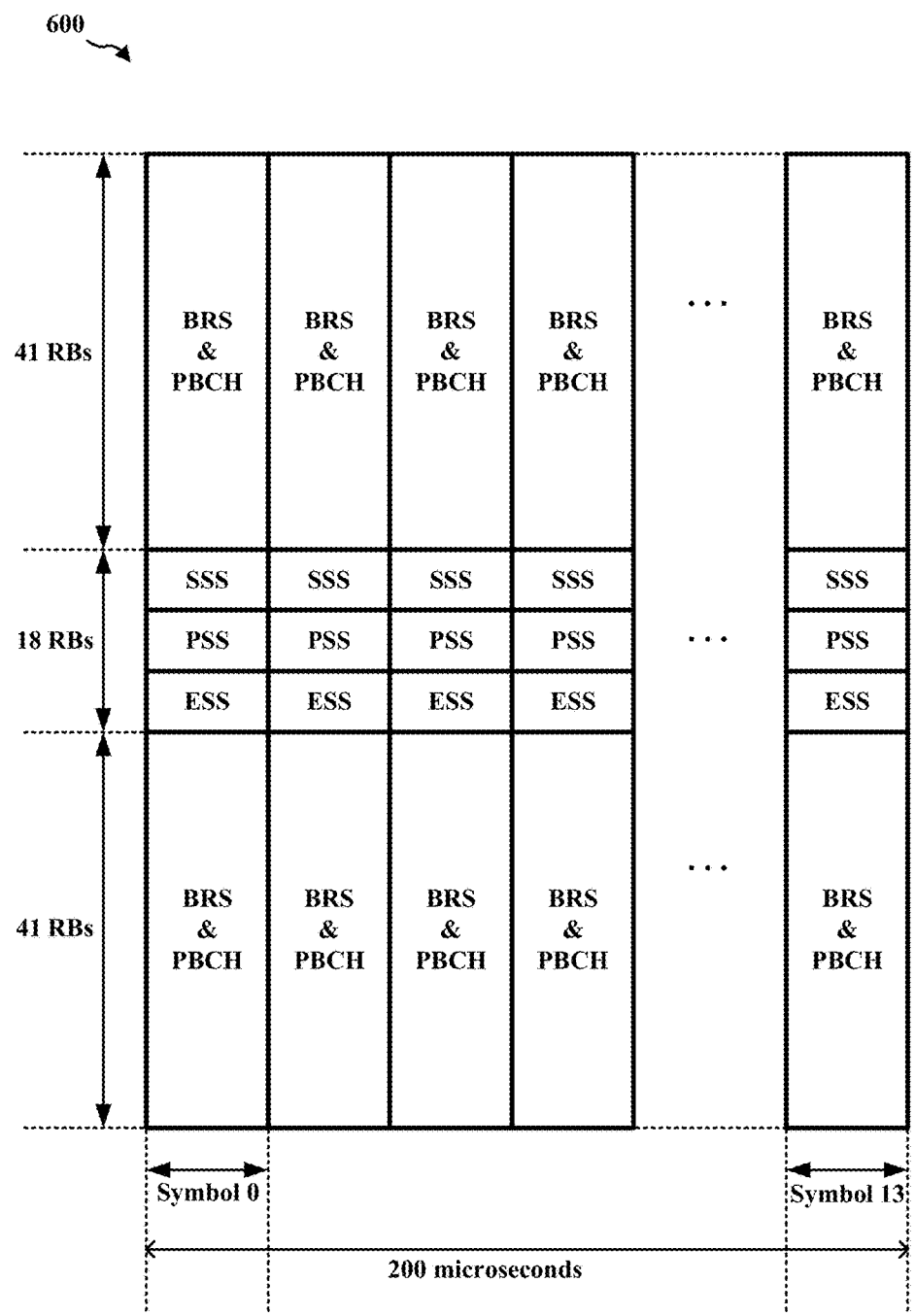
FIG. 6 is an example diagram illustrating a synchronization subframe structure.

FIG. 6 is an example diagram 600 illustrating a synchronization subframe structure. The synchronization subframe structure in the example diagram 600 may be for a millimeter wave communication system. The synchronization subframe may be divided into 14 symbols, from symbol 0 to symbol 13. Within each symbol, 100 subcarriers may be communicated, where the first 41 RBs are used to carry BRSs and PBCHs, the next 18 RBs are used to carry an SSS, a PSS, and an ESS, and the next 41 RBs are used to carry BRSs and PBCHs.

A base station (e.g., an LTE base station) may determine and/or convey various parameters to a UE. For example, a base station may convey a duplex configuration to a UE, where the duplex configuration indicates whether a cell served by the base station operates in a TDD mode or in an FDD mode. For example, the base station may convey the duplex configuration via a transmission in a time-gap (in a number of OFDM symbols) between a PSS transmission and an SSS transmission. In particular, in an FDD mode, a PSS transmission and an SSS transmission occur in adjacent OFDM symbols. In a TDD mode, there may be a gap between OFDM symbols used for a PSS transmission and OFDM symbols used for an SSS transmission. The UE may first detect a PSS and subsequently search for an SSS by searching for an SSS transmission in an FDD mode and an SSS transmission in a TDD mode. If the UE detects an SSS transmission adjacent to the PSS transmission, then the UE may determine that the cell operates in the FDD mode. If the UE detects that the SSS transmission is spaced apart from the PSS transmission, the UE may determine that the cell operates in the TDD mode. However, such an approach to indicate the duplex configuration may be inefficient, especially in a system that performs beam sweeping of signals in multiple directions. The inefficiency may be due to added latency from beam sweeping in multiple directions and possibly due to being unable to utilize all OFDM symbols between a PSS transmission and an SSS transmission. Further, a PSS and an SSS may be transmitted at the same time in an FDM manner, without a time-gap between a PSS transmission and an SSS transmission. Thus, an efficient approach to convey information on one or more parameters (e.g., system parameters) may be desired.

According to an aspect of the disclosure, a specific scheme for conveying information (e.g., for conveying parameter information of at least one system parameter) may be done by selecting resources in a specific manner that corresponds to the parameter information, the parameter information including parameter values for the one or more system parameters. For example, a particular resource location used by a base station to transmit a signal (e.g., a synchronization signal) and/or a resource amount may correspond to a particular parameter value. The base station may select one or more resources for transmission of a signal from multiple candidate resources for transmission of the signal. Thus, the base station transmits a signal using one or more resources selected from the candidate resources. The resources selected for transmission of a signal correspond to particular parameter information (particular parameter value(s)) for one or more parameters, and thus the resource selection by the base station is based on the parameter information to be conveyed to a UE. In an aspect, when the base station transmits the signal using the selected resources, the base station may transmit the signal using one or more mmW beams, and may transmit the signal in a beam-sweeping manner (e.g., by transmitting fourteen beams (beam 1-beam 14) in fourteen different directions, as discussed supra). When the UE receives a signal transmitted from the base station, the UE may detect (e.g., by blind decoding) a signal on the candidate resources. When the UE detects the signal, the UE may determine the particular resources on which the UE detects the signal. Based on the particular resources on which the UE detects the signal, the UE may determine the parameter information corresponding to the particular resources on which the UE detects the signal. Because a resource selected by the base station to transmit a signal corresponds to a particular parameter value for a particular parameter, the UE may determine the parameter value of the particular parameter based on the resource on which the UE detects the signal. The signal may include at least one synchronization signal such as a PSS, an SSS, an ESS, a BRS, and a PBCH signal.

One or more parameters whose values may be conveyed in the parameter information may include one or more of a cyclic prefix (CP) duration parameter, a BRS transmission parameter, and a duplex configuration parameter. The BRS transmission parameter may indicate whether a BRS transmission is triggered or is not triggered. Thus, for example, when the base station selects a resource for transmitting a synchronization signal, selection of a first resource in a first location may indicate that the BRS transmission is triggered, whereas selection of a second resource in a second location may indicate that the BRS transmission is not triggered. The BRS transmission parameter may indicate which BRS configuration is used for BRS transmission. For example, the BRS configuration may be either configuration 1 or configuration 2, and the BRS transmission parameter may indicate either configuration 1 or configuration 2. Thus, for example, when the base station selects a resource for transmitting a synchronization signal, selection of a third resource in a third location may indicate that configuration 1 is used for BRS transmission, and selection of a fourth resource in a fourth location may indicate that configuration 2 is used for BRS transmission. The BRS configuration may correspond to resources for BRS transmission (e.g., resources in time and frequency). For example, configuration 1 may correspond to one set of resources for BRS transmission and configuration 2 may correspond to another set of resources for BRS transmission. Therefore, in such an example, because a particular location of a resource used for transmitting a synchronization signal may indicate a particular BRS transmission parameter value, the UE may determine the particular BRS transmission parameter value (e.g., BRS configuration) based on the particular location of the resource for the synchronization signal.

The duplex configuration parameter may indicate whether a cell served by the base station is operating in a TDD mode or in an FDD mode. Thus, for example, selection of a first resource in a first location may indicate that a TDD mode is used, and selection of a second resource in a second location may indicate that an FDD mode is used. Therefore, in such an example, because a particular location of a resource used for transmitting a synchronization signal may indicate a particular duplex configuration parameter value, the UE may determine the particular duplex configuration parameter value (e.g., the TDD mode or the FDD mode) based on the particular location of the resource for the synchronization signal.

A CP duration parameter may indicate a CP duration (e.g., CP size). A system including the base station may utilize either an extended CP (ECP) or a normal CP (NCP). Thus, the CP duration parameter may indicate either an ECP or an NCP, where a ECP duration (e.g., 10 microseconds) may be longer than an NCP duration (e.g., 6 microseconds). Thus, for example, when the base station selects a resource for transmitting a synchronization signal, selection of a first resource in a first location may indicate that an ECP is used, and selection of a second resource in a second location may indicate that an NCP is used. Therefore, in such an example, because a particular location of a resource used for transmitting a synchronization signal may indicate a particular CP duration parameter value, the UE may determine the particular CP duration parameter value (e.g., the ECP or the NCP) based on the particular location of the resource for the synchronization signal.

In another aspect, when the base station sends a PBCH signal to a UE, the base station may determine the CP duration parameter and may indicate the CP duration parameter in a PBCH signal transmitted to a UE. For example, one bit in the PBCH signal may be used to indicate whether the system utilizes an ECP or an NCP. In such an aspect, when the UE receives a PBCH signal, the UE may determine the CP duration parameter value based on the information (e.g., based on the one bit) in the PBCH signal. For example, a bit value of 1 in the PBCH signal may indicate that the system utilizes an ECP, and a bit value of 0 in the PBCH signal may indicate that the system utilizes an NCP.

Figure 7:
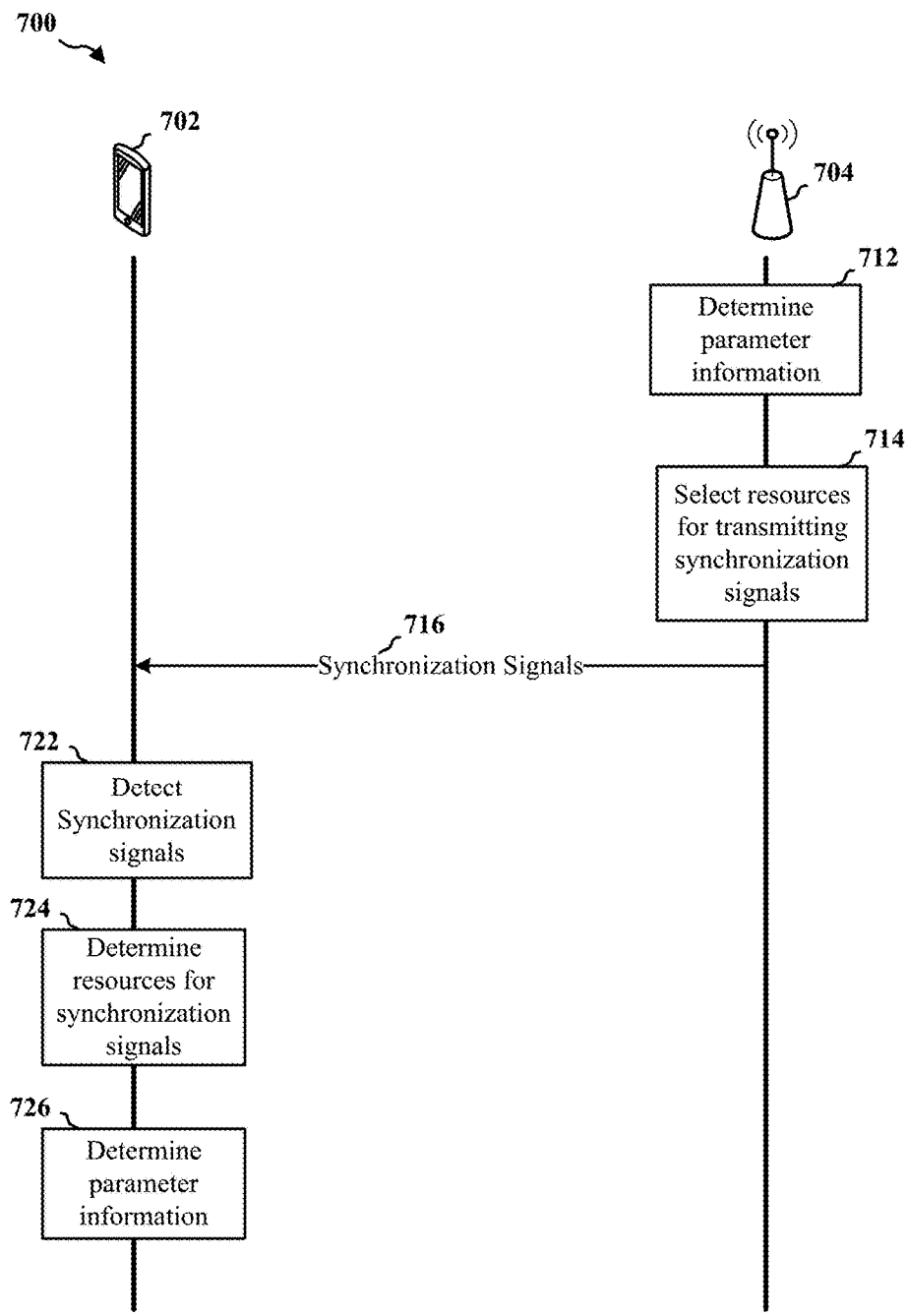
FIG. 7 is an example diagram illustrating communication between a user equipment and a base station, according to an aspect of the disclosure.

FIG. 7 is an example diagram 700 illustrating communication between a user equipment and a base station, according to an aspect of the disclosure. The example diagram 700 involves communication between a UE 702 and a base station 704. At 712, the base station 704 determines parameter information (parameter values) for one or more parameters. At 714, the base station 704 selects resources (e.g., subcarrier resources) from candidate resources for transmission of one or more synchronization signals based on the parameter information being conveyed. As discussed above, the base station 704 selects a particular resource that corresponds to a particular parameter value in the parameter information. For example, if a parameter can have three values, the base station 704 may select one of three different resource locations based on the value of the parameter to be conveyed. If a second parameter to be conveyed can have two values, the base station 704 may select one of two resource locations associated with the second parameter based on the value of the second parameter to be conveyed. At 716, the base station 704 may transmit the synchronization signals using the selected resources. At 722, the UE 702 blindly searches for the synchronization signals in the candidate resources to detect the synchronization signals. At 724, based on the blind search, the UE determines the resources on which the synchronization signals are detected within the candidate resources (e.g., candidate subcarrier resources). At 726, the UE 702 determines the parameter information based on the resources where the synchronization signals are detected. The resources may be used to determine the parameter information because particular resources correspond to particular parameter information. For example, if there are three possible parameter values for a particular parameter, the synchronization signal may be detected on one of three resources, where the resource detected identifies the parameter and the parameter value. UE 702 may use a mapping table that maps resources to respective parameters and to respective parameter values.

The base station may select resources using one or more approaches to indicate the parameter information. According to an aspect, selecting particular resources to convey parameter information may include selecting a length of a guard subcarrier resource that exists between resources used for a transmission of one synchronization signal (e.g., PSS) and resources used for transmission of another synchronization signal (e.g., SSS). Thus, the base station may select the resources for transmitting the synchronization signals such that a particular length of the guard subcarriers between two synchronization signals indicates a particular parameter value of a particular parameter. When the UE detects the two synchronization signals in the resources carrying the two synchronization signals, the UE may determine the length of the guard subcarriers based on the resources, and may determine a parameter value corresponding to the length of the guard subcarriers. For example, if the parameter being conveyed can have one of three possible parameter values, a first number of guard subcarriers may indicate a first parameter value of the parameter, a second number of guard subcarriers may indicate a second parameter value of the parameter, and a third number of guard subcarriers may indicate the third parameter value of the parameter. In one aspect, the UE may determine the length of the guard subcarriers based on locations of the resources on which the two synchronization signals are detected. The length of guard subcarriers may be in a number of subcarriers. For example, use of 4 guard subcarriers between two different synchronization signals may indicate a TDD mode and use of 5 guard subcarriers between the two different synchronization signals may indicate an FDD mode for the duplex configuration parameter. In an aspect, selecting the resources to indicate parameter information may include determining a distance between a center frequency of one synchronization signal and a center frequency of another synchronization signal, such that the distance between the center frequencies of the synchronization signals may be used to indicate a particular parameter value of a particular parameter.

In an aspect, selecting the resources to indicate parameter information may include determining resources (e.g., subcarriers) for transmitting a synchronization signal. For example, the base station may select particular subcarriers for transmission of a synchronization signal, to indicate a particular parameter information. For example, selecting subcarrier numbers 500-550 for transmission of a synchronization signal may indicate one parameter value and selecting subcarrier numbers 501-550 for transmission of the synchronization signal may indicate another parameter value.

FIGS. 8A and 8B are example diagrams illustrating indication of parameter information based on guard subcarriers and/or resource locations. FIG. 8A is an example diagram 800 with an indication of parameter information with a particular parameter value and FIG. 8B is an example diagram 850 with an indication of parameter information with another particular parameter value, when the synchronization signals are frequency-division multiplexed. In the example diagram 800, a base station uses first subcarriers 812 to transmit a first synchronization signal (Sync 1, e.g., a PSS), second subcarriers 814 to transmit a second synchronization signal (Sync 2, e.g., an SSS), and further uses guard subcarriers 816 that are located between the first subcarriers 812 used for the first synchronization signal and the second subcarriers 814 used for the second synchronization signal. The first synchronization signal is transmitted using the first subcarriers 812 with subcarrier numbers 401-490 and the second synchronization signal is transmitted using the second subcarriers 814 with subcarrier numbers 501-590, where the guard subcarriers 816 with subcarrier numbers 491-500 are located between the first subcarriers 812 and the second subcarriers 814. Thus, in the example shown in the example diagram 800, the base station has selected subcarrier resources for the first synchronization and the second synchronization, to provide that the length of the guard subcarriers is 10 subcarriers, and a distance between a center frequency of the first synchronization signal (at subcarrier number 445) and a center frequency of the second synchronization signal (at subcarrier number 545) is 100 subcarriers.

In the example diagram 850 of FIG. 8B, a base station uses first subcarriers 862 to transmit a first synchronization signal (Sync 1, e.g., a PSS), second subcarriers 864 to transmit a second synchronization signal (Sync 2, e.g., an SSS), and further uses guard subcarriers 866 that are located between the first subcarriers 862 used to transmit the first synchronization signal and the second subcarriers 814 used to transmit the second synchronization signal. The first synchronization signal is transmitted using the first subcarriers 862 with subcarrier numbers 401-490 and the second synchronization signal is transmitted using the second subcarriers 864 with subcarrier numbers 502-591, where the guard subcarriers 866 with subcarrier numbers 491-501 are located between the first subcarriers 862 and the second subcarriers 864. Thus, in the example shown in the example diagram 800, the base station has selected subcarrier resources for the first synchronization and the second synchronization, to provide that the length of the guard subcarrier is 11 subcarriers, and a distance between a center frequency of the first synchronization signal (at subcarrier number 445) and a center frequency of the second synchronization signal (at subcarrier number 546) is 101 subcarriers.

With reference to the example diagrams 800 and 850, in an aspect, when the base station selects subcarrier resources for the synchronization signals, the base station may select a length of a guard subcarrier to indicate a certain parameter value. The base station may select a guard subcarrier length of 10 subcarriers, as shown in the example diagram 800, to indicate a first parameter value, and may select a guard subcarrier length of 11 subcarriers, as shown in the example diagram 850, to indicate a second parameter value. In such a case, if the UE detects the first synchronization signal in the first subcarriers 812 (subcarrier numbers 401-490) and the second synchronization signal in the second subcarriers 814 (subcarrier numbers 501-590), the UE may determine that the guard subcarrier length is 10 and thus determine the first parameter value. If the UE detects the first synchronization signal in the first subcarriers 862 (subcarrier numbers 401-490) and the second synchronization signal in the second subcarriers 864 (subcarrier numbers 502-591), the UE may determine that the guard subcarrier length is 11 and thus determine the second parameter value. In one example, the base station may select a guard subcarrier length of 10 to indicate a TDD mode or may select a guard subcarrier length of 11 to indicate an FDD mode. In an aspect, parameter information of two or more parameters may be indicated via different combinations of the parameter values for the two or more parameters. For example, to indicate parameter information for a duplex configuration parameter and a CP duration parameter, the base station may select a guard subcarrier length of 10 to indicate TDD mode/ECP, or a guard subcarrier length of 11 to indicate TDD mode/NCP, or a guard subcarrier length of 12 to indicate FDD mode/ECP, or a guard subcarrier length of 13 to indicate FDD mode/ECP. Thus, there is a mapping between a guard subcarrier length to a particular parameter value of a particular parameter.

In an aspect, when the base station selects subcarrier resources for the synchronization signals, the base station may select a distance between a center frequency of one synchronization signal and a center frequency of another synchronization signal to indicate a certain parameter value that corresponds to the selected distance. When the UE detects the two synchronization signals in the resources carrying the two synchronization signals, the UE may determine a distance between a center frequency of one synchronization signal and a center frequency of another synchronization signal based on the resources, and may determine a parameter value corresponding to the distance between the two center frequencies. For example, the base station may select the distance between the center frequencies to be 100 subcarriers, as shown in the example diagram 800, to indicate a first parameter value, and may select the distance between the center frequencies to be 101 subcarriers, as shown in the example diagram 850, to indicate second parameter value. In such a case, if the UE detects the first synchronization signal in the first subcarriers 812 and the second synchronization signal in the second subcarriers 814, the UE may determine that the distance between the center frequencies of the first frequency and the second frequency is 100 subcarriers and thus determine the first parameter value. If the UE detects the first synchronization signal in the first subcarriers 862 and the second synchronization signal in the second subcarriers 864, the UE may determine that the distance between the center frequencies of the first frequency and the second frequency is 101 subcarriers and thus determine the second parameter value. In one example, the base station may select resources such that the distance between the center frequencies is 100 to indicate a TDD mode or may select resources such that the distance between the center frequencies is 101 to indicate an FDD mode. In an aspect, parameter information of two or more parameters may be indicated via different combinations of the parameter values for the two or more parameters. For example, to indicate parameter information for a duplex configuration parameter and a CP duration parameter, the base station may select resources where the distance between the center frequencies is 100 to indicate TDD mode/ECP, or the distance between the center frequencies is 101 to indicate TDD mode/NCP, or the distance between the center frequencies is 102 to indicate FDD mode/ECP, or the distance between the center frequencies is 103 to indicate FDD mode/ECP.

In an aspect, a location of the subcarrier resources that the base station selects to transmit a synchronization signal may indicate a particular parameter value. When the UE detects the synchronization signals in the subcarrier resources carrying the synchronization signal, the UE may determine a location of the subcarrier resources on which the synchronization signal is detected, and may determine a parameter value corresponding to the location of the subcarrier resources. With reference to the example diagrams 800 and 850, for example, the base station may select subcarriers with subcarrier numbers 501-590 (for transmitting a second synchronization signal) to indicate a first parameter value, and may select subcarriers with subcarrier numbers 502-591 to indicate a second parameter value. In such a case, if the UE detects the second synchronization signal in subcarrier numbers 501-590, the UE may determine the first parameter value. If the UE detects the second synchronization signal in subcarrier numbers 501-591, the UE may determine the second parameter value. In one example, the base station may select subcarriers with subcarrier numbers 501-590 to indicate a TDD mode or may select subcarriers with subcarrier numbers 501-591 to indicate an FDD mode. In an aspect, parameter information of two or more parameters may be indicated via different combinations of the parameter values for the two or more parameters. For example, to indicate parameter information for a duplex configuration parameter and a CP duration parameter, the base station may select subcarriers with subcarrier numbers 501-590 to indicate TDD mode/ECP, or subcarriers with subcarrier numbers 501-591 to indicate TDD mode/NCP, or subcarriers with subcarrier numbers 501-592 to indicate FDD mode/ECP, or subcarriers with subcarrier numbers 501-593 to indicate FDD mode/ECP.

Figures 9A, 9B:
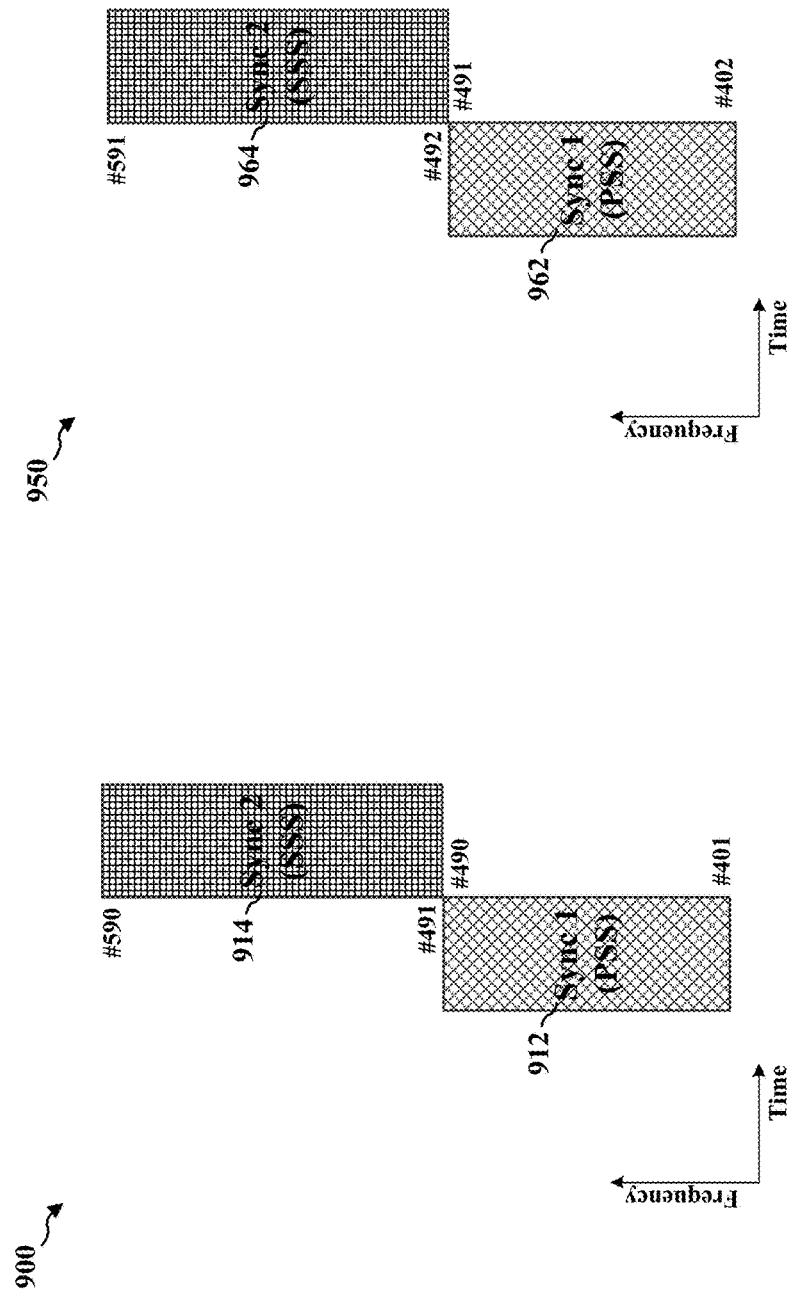
FIGS. 9A and 9B are example diagrams illustrating indication of parameter information based on resource locations, according to an aspect of the disclosure.

FIGS. 9A and 9B are example diagrams illustrating indication of parameter information based on resource locations. FIG. 9A is an example diagram 900 with an indication of parameter information with a particular parameter value and FIG. 9B is an example diagram 950 with an indication of parameter information with another particular parameter value, when the synchronization signals are time-division multiplexed. In the example diagram 900, a base station uses first subcarriers 912 to transmit a first synchronization signal (Sync 1, e.g., a PSS), second subcarriers 914 to transmit a second synchronization signal (Sync 2, e.g., an SSS). The transmission time for the second synchronization signal is later than the transmission time for the first synchronization signal, due to the time division multiplexing. The first synchronization signal is transmitted using the first subcarriers 912 with subcarrier numbers 401-490 and the second synchronization signal is transmitted using the second subcarriers 914 with subcarrier numbers 491-590. In the example diagram 950, a base station uses first subcarriers 962 to transmit a first synchronization signal (Sync 1, e.g., a PSS), second subcarriers 964 to transmit a second synchronization signal (Sync 2, e.g., a SSS). The transmission time for the second synchronization is later than the transmission time for the first synchronization time, due to the time division multiplexing. The first synchronization signal is transmitted using the first subcarriers 962 with subcarrier numbers 402-491 and the second synchronization signal is transmitted using the second subcarriers 964 with subcarrier numbers 492-591.

With reference to the example diagrams 900 and 950, the subcarrier resources that the base station selects to transmit a synchronization signal may indicate a particular parameter value. For example, the base station may select subcarriers with subcarrier numbers 491-590 to transmit the second synchronization signal to indicate one particular parameter value, and may select subcarriers with subcarrier numbers 492-591 to indicate another particular parameter value. In such a case, if the UE detects the second synchronization signal in subcarrier numbers 491-590, the UE may determine the first parameter value. If the UE detects the second synchronization signal in subcarrier numbers 492-591, the UE may determine the second parameter value. In one example, the base station may select subcarriers with subcarrier numbers 491-590 to indicate a TDD mode or may select subcarriers with subcarrier numbers 492-591 to indicate an FDD mode. In an aspect, parameter information of two or more parameters may be indicated via different combinations of the parameter values for the two or more parameters. For example, to indicate parameter information for a duplex configuration parameter and a CP duration parameter, the base station may select particular subcarriers to be used for transmission of the second synchronization signal, where the base station may select subcarriers with subcarrier numbers 491-590 to indicate TDD mode/ECP, or subcarriers with subcarrier numbers 492-591 to indicate TDD mode/NCP, or subcarriers with subcarrier numbers 493-592 to indicate FDD mode/ECP, or subcarriers with subcarrier numbers 494-593 to indicate FDD mode/ECP.

In an aspect of the disclosure, selecting the resources to indicate parameter information may include selecting an order of transmission of synchronization signals. In particular, the base station may indicate different parameter values by selecting a specific order (sequence) of synchronization signal transmissions. For example, a base station may determine to transmit a first synchronization signal and then a second synchronization signal to indicate a first parameter value, and may determine to transmit the second synchronization signal and then the first synchronization signal to indicate a second parameter value. In an aspect, the base station may select resources for the synchronization signals in a particular order such that the synchronization signals may be transmitted in the particular order, which indicates a particular parameter value. For example, the base station may select an earlier time resource for the first synchronization signal and a later time resource for the second synchronization signal to indicate the first parameter value, and select an earlier time resource for the second synchronization signal and a later time resource for the first synchronization signal to indicate the second parameter value. The UE may detect the synchronization signals in candidate resources, may determine the order of the synchronization signals based on the order of reception of the synchronization signals, and may determine a particular parameter value that corresponds to the order of the synchronization signals. For example, if the UE detects the first synchronization signal and then the second synchronization signal, the UE may determine that the order of the first and second synchronization signals indicates the first parameter value. For example, if the UE detects the second synchronization signal and then the first synchronization signal, the UE may determine that the order of the second and first synchronization signals indicates the second parameter value. In one example, a combination of different approaches may be used to convey parameter values of a particular parameter. For example, one parameter value may be conveyed using the order of the synchronization signals and two other parameter values may be conveyed based on a spacing between two synchronization signals.

Figure 10B:
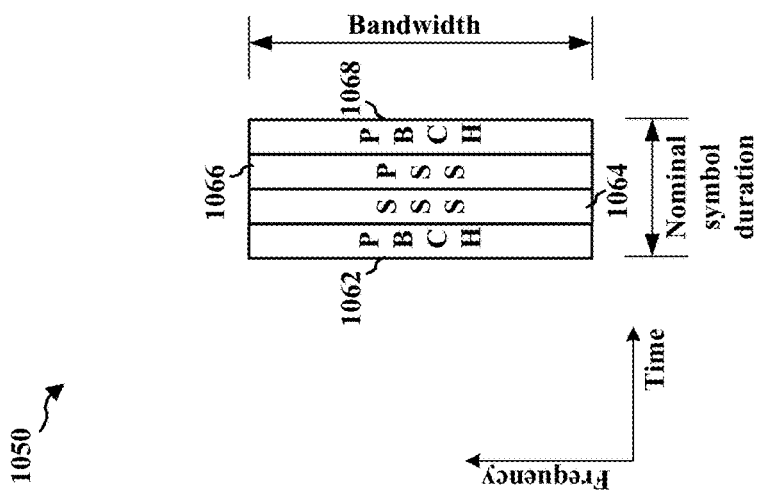
FIGS. 10A and 10B are example diagrams illustrating transmission of synchronization signals in particular orders, according to an aspect of the disclosure.
Figure 10A:
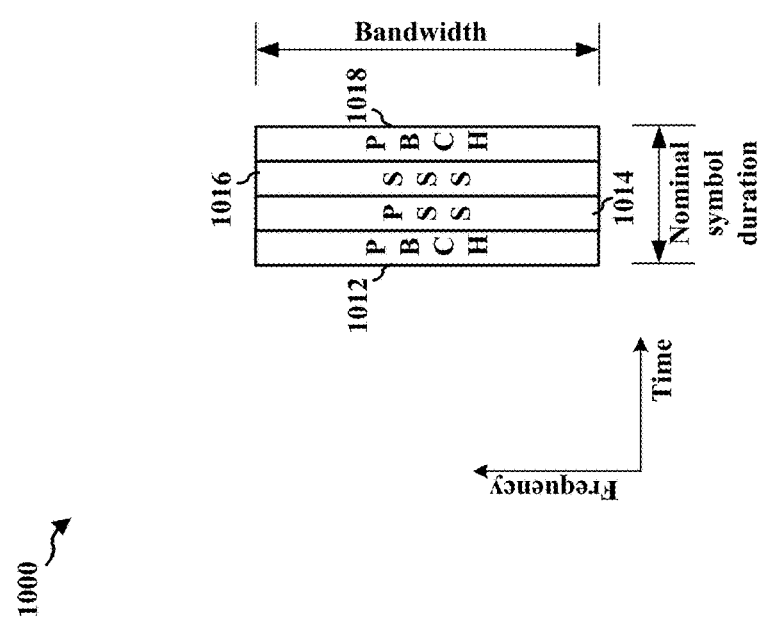

FIGS. 10A and 10B are example diagrams illustrating transmission of synchronization signals in particular orders. FIG. 10A is an example diagram 1000 illustrating transmission of synchronization signals in a particular order to indicate a particular parameter value. During a nominal symbol duration, the base station may transmit a PBCH signal 1012, a PSS 1014, an SSS 1016, and a repetition of the PBCH 1018 signal. In the example diagram 1000, the order of transmissions of the synchronization signals shows that the PSS 1014 is transmitted before the SSS 1016. The particular order of transmissions of the PSS 1014 and the SSS 1016 may indicate a particular parameter value for a particular parameter. Thus, the base station may select resources for the synchronization signals such that the PSS 1014 is transmitted first and then the SSS 1016 is transmitted, to indicate a particular parameter value of the particular parameter. FIG. 10B is an example diagram 1050 illustrating transmission of synchronization signals in another particular order to indicate another particular parameter value of the particular parameter. During a nominal symbol duration, the base station may transmit a PBCH signal 1062, an SSS 1064, a PSS 1066, and a repetition of the PBCH 1068 signal. In the example diagram 1050, the order of transmissions of the synchronization signals shows that the SSS 1064 is transmitted before the PSS 1066. The particular order of transmissions of the SSS 1064 and the PSS 1066 in the example diagram 1050 is different from the order of the transmissions of the PSS 1014 and the SSS 1016. Thus, the order of transmissions of the SSS 1064 and the PSS 1066 indicates a particular parameter value that is different from the parameter value indicated by the order of transmissions of the PSS 1014 and the SSS 1016. Therefore, the base station may select resources for the synchronization signals such that the SSS 1064 is transmitted first and then the PSS 1066 is transmitted, to indicate a particular parameter value for a particular parameter.

For example, with reference to the example diagrams 1000 and 1050, for a duplex configuration parameter, the base station may select resources to transmit the PSS 1014 before the SSS 1016 in order to indicate a TDD mode, or may select resources to transmit the SSS 1064 before the PSS 1066 in order to indicate an FDD mode. In such a case, if the UE detects the PSS 1014 before the SSS 1016 in the candidate resources, the UE determines the TDD mode, whereas if the UE detects the SSS 1064 before the PSS 1066 in the candidate resources, the UE determines the FDD mode. In an aspect, parameter information of two or more parameters may be indicated via different orders of three or more synchronization signals, for the two or more parameters. For example, to indicate parameter information for a duplex configuration parameter and a CP duration parameter, the base station may select resources to transmit a PSS, an SSS, and a BRS sequentially to indicate TDD mode/ECP, or to transmit the SSS, the PSS, and the BRS sequentially to indicate TDD mode/NCP, or to transmit the PSS, the BRS, and the SSS sequentially to indicate FDD mode/ECP, or to transmit the BRS, the PSS, and the SSS sequentially to indicate FDD mode/ECP.

FIGS. 11A, 11B, and 11C are example diagrams illustrating transmission of synchronization signals, according to an aspect of the disclosure. FIG. 11A is an example diagram 1100 illustrating transmission of synchronization signals spread over a radio frame, according to an aspect of the disclosure. The base station may transmit synchronization signals such as a PSS, an SSS, and a PBCH signal in two sessions within one radio frame. In this example, because the radio frame is 10 milliseconds long, the base station may transmit synchronization signals every 5 milliseconds. In particular, the base station may use a first synchronization channel 1112 within a radio frame to transmit the synchronization signals a first time (e.g., during a first synchronization subframe), and then use a second synchronization channel 1114 to transmit the synchronization signals again at a later time (e.g., during a second synchronization subframe). The RACH may occur at 1116 after the second synchronization channel 1114.

FIG. 11B is an example diagram 1130 illustrating transmission of synchronization signals using a synchronization channel with a particular order of the synchronization signals. In this example, the base station may process the synchronization signals for a synchronization channel (e.g., the first synchronization channel 1112 or the second synchronization channel 1114) such that a cyclic prefix is present between different synchronization signals in the processed synchronization signal 1132. The synchronization signals may be processed by time-division multiplexing the PSS, the SSS, and the PBCH. For example, the processed synchronization signal 1132 may be obtained by time-division multiplexing a PBCH 1012, a PSS 1014, an SSS 1016, and a repetition of the PBCH 1018 in the example diagram 1000 of FIG. 10A. During the transmission of the processed synchronization signal 1132 in one symbol, the base station may transmit the PBCH during a first time period 1134, the PSS during a the second time period 1136, and the SSS in a third time period 1138, and the repetition of the PBCH during a fourth time period 1140, with a cyclic prefix before the beginning of each of the first, second, third, and fourth time periods 1134, 1136, 1138, and 1140. Thus, the base station has selected resources for the synchronization signals such that the PSS is transmitted first and then the SSS is transmitted, to indicate a particular parameter value corresponding to the order of transmissions of the PSS and the SSS. Each of the first, second, third, and fourth time periods 1634, 1636, 1638, and 1640 may correspond to an OFDM symbol. In an aspect, a PBCH signal and a repeated PBCH signal may be spaced apart in time during time-division multiplexing. In this case, because there are fourteen symbols, transmission of the processed synchronization signal 1132 may be performed fourteen times via beam-forming in fourteen directions in a sweeping manner (e.g., to cover the entire sector).

FIG. 11C is an example diagram 1160 illustrating transmission of synchronization signals using a synchronization with another particular order of the synchronization signals. In this example, the base station may process the synchronization signals for a synchronization channel (e.g., the first synchronization channel 1112 or the second synchronization channel 1114) such that a cyclic prefix is present between different synchronization signals in the processed synchronization signal 1162. The synchronization signals may be processed by time-division multiplexing the PSS, the SSS, and the PBCH. For example, the processed synchronization signal 1162 may be obtained by time-division multiplexing a PBCH 1062, an SSS 1064, a PSS 1066, and a repetition of the PBCH 1068 in the example diagram 1050 of FIG. 10B. During the transmission of the processed synchronization signal 1162 in one symbol, the base station may transmit the PBCH during a first time period 1164, the SSS during a the second time period 1166, and the PSS in a third time period 1168, and the repetition of the PBCH during a fourth time period 1170, with a cyclic prefix before the beginning of each of the first, second, third, and fourth time periods 1164, 1166, 1168, and 1170. Thus, the base station has selected resources for the synchronization signals such that the SSS is transmitted first and then the PSS is transmitted, to indicate a particular parameter value corresponding to the order of transmissions of the PSS and the SSS. Each of the first, second, third, and fourth time periods 1634, 1636, 1638, and 1640 may correspond to an OFDM symbol. In an aspect, a PBCH signal and a repeated PBCH signal may be spaced apart in time during time-division multiplexing. In this case, because there are fourteen symbols, transmission of the processed synchronization signal 1162 may be performed fourteen times via beam-forming in fourteen directions in a sweeping manner (e.g., to cover the entire sector).

Figure 12:
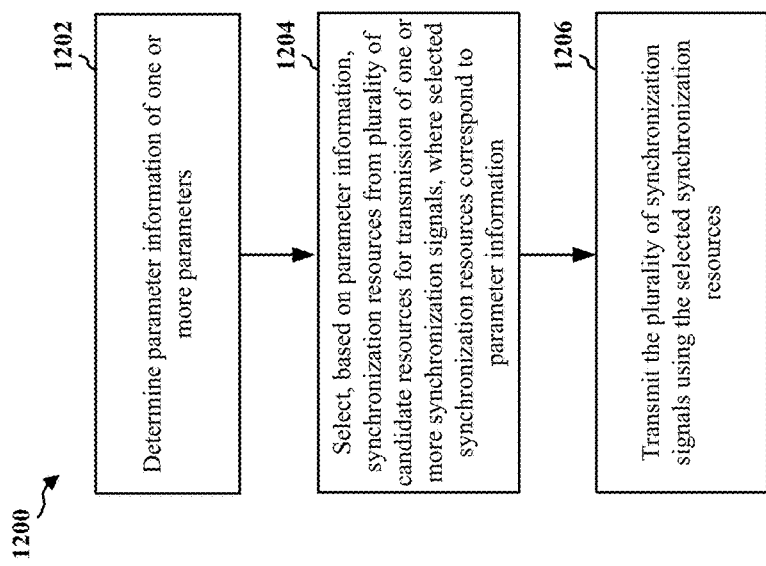
FIG. 12 is a flowchart of a method of wireless communication.

FIG. 12 is a flowchart 1200 of a method of wireless communication. The method may be performed by a base station (e.g., the base station 704, the apparatus 1402/1402'). At 1202, the base station determines parameter information of one or more parameters. For example, as discussed supra, a base station (an LTE base station) may determine and/or convey various parameters to a UE. In an aspect, the parameter information of the one or more parameters includes a parameter value of each of at least one of a CP duration parameter, a BRS transmission parameter, a duplex configuration parameter. For example, as discussed supra, one or more parameters whose values may be conveyed in the parameter information may include one or more of a CP duration parameter, a BRS transmission parameter, and a duplex configuration parameter. In such an aspect, the CP duration parameter may indicate whether an ECP is used or an NCP is used. For example, as discussed supra, the CP duration parameter may indicate either an ECP or an NCP, where a ECP duration (e.g., 10 microseconds) may be longer than an NCP duration (e.g., 6 microseconds). In such an aspect, the BRS transmission parameter may include at least one of an BRS transmission indicator or a BRS configuration parameter, the BRS transmission indicator indicating whether a BRS transmission is triggered or not and the BRS configuration parameter indicating a resource for transmission of a BRS. For example, as discussed supra, the BRS transmission parameter may indicate whether a BRS transmission is triggered or is not triggered, and/or may indicate which BRS configuration is used for BRS transmission. In such an aspect, the duplex configuration parameter may indicate whether a base station utilizes a TDD or an FDD. For example, as discussed supra, the duplex configuration parameter may indicate whether a cell served by the base station is operating in a TDD mode or in an FDD mode.

At 1204, the base station selects, based on the parameter information, synchronization resources from a plurality of candidate resources for transmission of one or more synchronization signals, where the selected synchronization resources correspond to the parameter information. For example, as discussed supra, the base station may select resources for transmission of a signal from multiple candidate resources for transmission of a signal, where the resources selected for transmission of a signal correspond to particular parameter information (particular parameter value(s)) for one or more parameters. In an aspect, the one or more synchronization signals may include at least one of a PSS, an SSS, an ESS, a BRS, or a PBCH signal. For example, as discussed supra, the signal transmitted by the base station may include at least one synchronization signal such as a PSS, an SSS, an ESS, a BRS, and a PBCH signal.

In an aspect, the base station may select the synchronization resources from a plurality of candidate resources by selecting a number of guard subcarriers positioned between subcarrier resources for at least two of the one or more synchronization signals within the synchronization resources, where the number of guard subcarriers indicates the parameter information, where the synchronization resources are selected based on the number of guard subcarriers. For example, as discussed supra, the base station may select the resources for transmitting the synchronization signals such that a particular length of the guard subcarriers between two synchronization signals indicates a particular parameter value.

In an aspect, the base station may select the synchronization resources from a plurality of candidate resources by selecting a distance between center frequencies of at least two of the one or more synchronization signals within the synchronization resources, where the synchronization resources are selected based on the distance between the center frequencies. For example, as discussed supra, when the base station selects subcarrier resources for the synchronization signals, the base station may select a distance between a center frequency of one synchronization signal and a center frequency of another synchronization signal to indicate a certain parameter value that corresponds to the selected distance. For example, as discussed supra, the base station may transmit a synchronization signal using one or more resources selected from the candidate resources.

In an aspect, the base station may select the synchronization resources from a plurality of candidate resources by determining a position of a subcarrier resource for at least one synchronization signal of the one or more synchronization signals within the synchronization resources, where the position of the subcarrier resource indicates the parameter information, where the synchronization resources are selected based on the subcarrier resource. For example, as discussed supra, a location of the subcarrier resources that the base station selects to transmit a synchronization signal may indicate a particular parameter value.

In an aspect, the base station may select the synchronization resources from a plurality of candidate resources by determining an order of at least two of the one or more synchronization signals, where the order indicates the parameter information, where the synchronization resources are selected based on the order of the at least two of the one or more synchronization signals. For example, as discussed supra, selecting the resources to indicate parameter information may include selecting an order of transmission of synchronization signals, where the base station may indicate different parameter values by selecting a specific order (sequence) of synchronization signal transmissions.

At 1206, the base station transmits the one or more synchronization signals using the selected synchronization resources. For example, as discussed supra, the base station transmits a signal (e.g., synchronization signal(s)) using synchronization resources selected by the base station. In an aspect, the one or more synchronization signals are transmitted via one or more mmW beams. For example, as discussed supra, when the base station transmits the signal using the selected resources, the base station may transmit the signal using one or more mmW beams, and may transmit the signal in a beam-sweeping manner.

Figure 13:
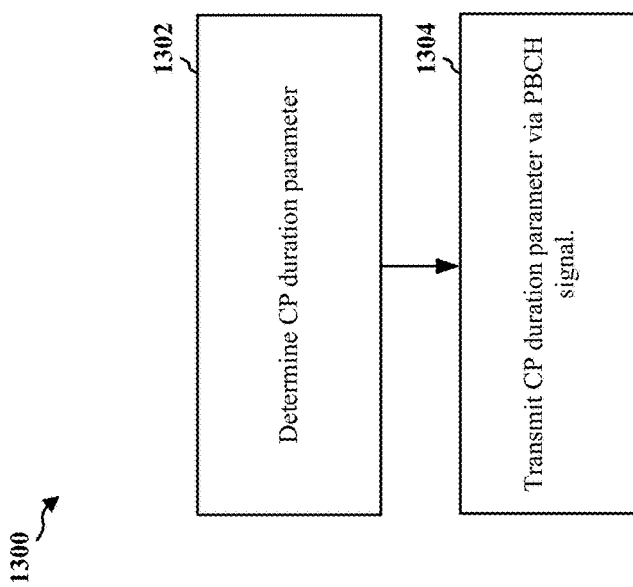
FIG. 13 is a flowchart of a method of wireless communication.

FIG. 13 is a flowchart 1300 of a method of wireless communication. The method may be performed by a base station (e.g., the base station 704, the apparatus 1402/1402'). At 1302, the base station determines a CP duration parameter. At 1304, the base station transmits the CP duration parameter via a PBCH signal. For example, as discussed supra, the base station may determine the CP duration parameter and may indicate the CP duration parameter in a PBCH signal transmitted to a UE. In an aspect, the CP duration parameter indicates whether an ECP is used or an NCP is used. For example, as discussed supra, one bit in the PBCH signal may be used to indicate whether the system utilizes an ECP or an NCP.

Figure 14:
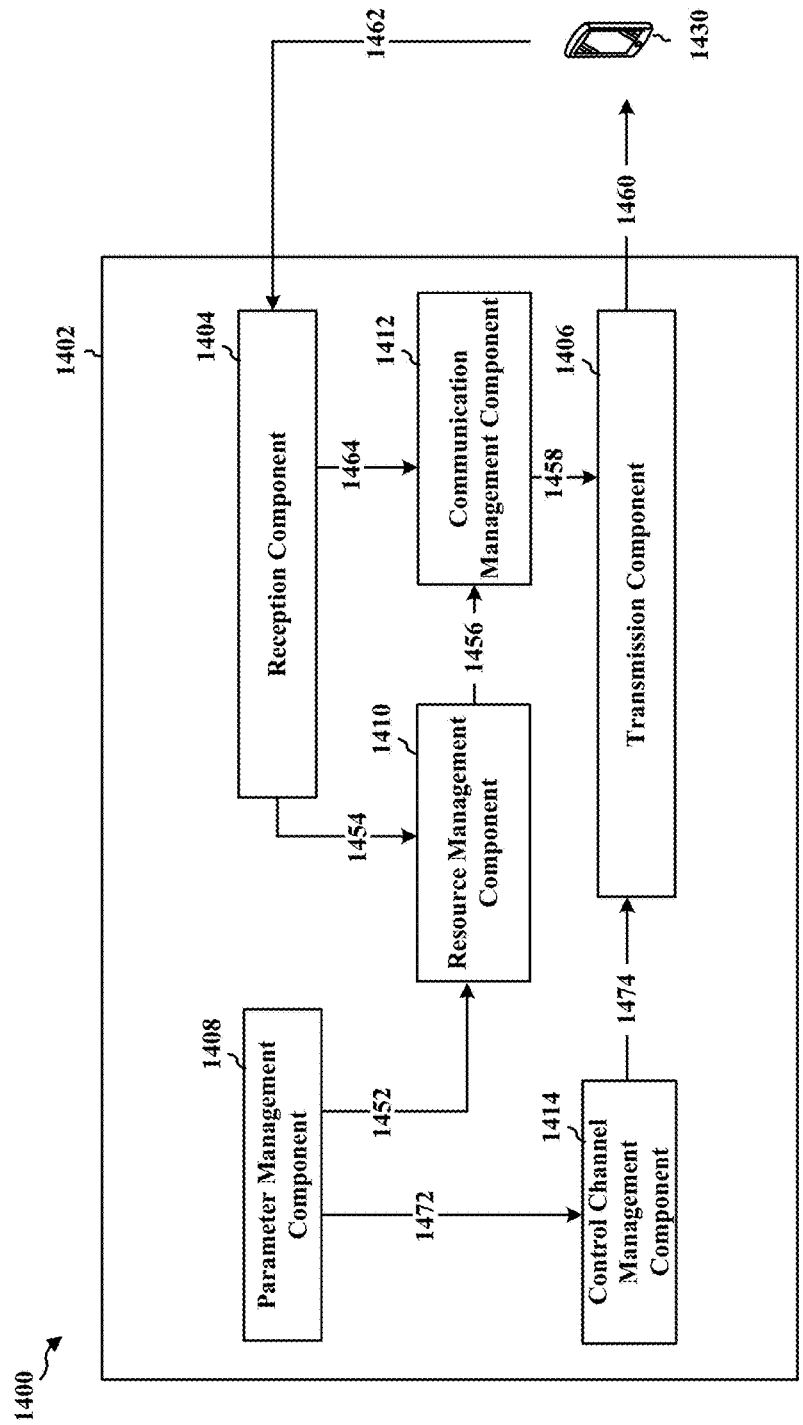
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a base station. The apparatus includes a reception component 1404, a transmission component 1406, a parameter management component 1408, a resource management component 1410, a communication management component 1412, and a control channel management component 1414.

According to an aspect of the disclosure, the parameter management component 1408 determines parameter information of one or more parameters. The parameter management component 1408 may forward the parameter information to the resource management component 1410, at 1452. In an aspect, the parameter information of the one or more parameters includes a parameter value of each of at least one of a CP duration parameter, a BRS transmission parameter, a duplex configuration parameter. In such an aspect, the CP duration parameter may indicate whether an ECP is used or an NCP is used. In such an aspect, the BRS transmission parameter may include at least one of an BRS transmission indicator or a BRS configuration parameter, the BRS transmission indicator indicating whether a BRS transmission is triggered or not and the BRS configuration parameter indicating a resource for transmission of a BRS. In such an aspect, the duplex configuration parameter may indicate whether a base station utilizes a TDD or an FDD.

The resource management component 1410 selects, based on the parameter information, synchronization resources from a plurality of candidate resources for transmission of one or more synchronization signals, where the selected synchronization resources correspond to the parameter information. The resource management component 1410 may consider information received from the reception component 1404 at 1454 to select the synchronization resources. The resource management component 1410 may forward information about the selected synchronization resources to the communication management component 1412, at 1456. In an aspect, the one or more synchronization signals include at least one of a PSS, an SSS, an ESS, a BRS, or a PBCH signal.

In an aspect, the resource management component 1410 selects the synchronization resources from a plurality of candidate resources by selecting a number of guard subcarriers positioned between subcarrier resources for at least two of the one or more synchronization signals within the synchronization resources, where the number of guard subcarriers indicates the parameter information, where the synchronization resources are selected based on the number of guard subcarriers. In an aspect, the resource management component 1410 selects the synchronization resources from a plurality of candidate resources by selecting a distance between center frequencies of at least two of the one or more synchronization signals within the synchronization resources, where the synchronization resources are selected based on the distance between the center frequencies. In an aspect, the resource management component 1410 selects the synchronization resources from a plurality of candidate resources by determining a position of a subcarrier resource for at least one synchronization signal of the one or more synchronization signals within the synchronization resources, where the position of the subcarrier resource indicates the parameter information, where the synchronization resources are selected based on the subcarrier resource. In an aspect, the resource management component 1410 selects the synchronization resources from a plurality of candidate resources by determining an order of at least two of the one or more synchronization signals, where the order indicates the parameter information, where the synchronization resources are selected based on the order of the at least two of the one or more synchronization signals.

The communication management component 1412 transmits, via the transmission component 1406, the one or more synchronization signals using the selected synchronization resources (e.g., to a UE 1430), at 1458 and 1460. In an aspect, the one or more synchronization signals are transmitted via one or more mmW beams. The communication management component 1412 may receive, via the reception component 1404, information form the UE 1430, at 1462 and 1464.

In another aspect of the disclosure, the parameter management component 1408 determines a CP duration parameter. The parameter management component 1408 may forward the CP duration parameter to the control channel management component 1414, at 1472. The control channel management component 1414 transmits, via the transmission component 1406, the CP duration parameter via a PBCH signal (e.g., to the UE 1430), at 1474 and 1460. In an aspect, the CP duration parameter indicates whether an ECP is used or an NCP is used.

The apparatus may include additional components that perform each of the blocks of the algorithm in the aforementioned flowcharts of FIGS. 12 and 13. As such, each block in the aforementioned flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
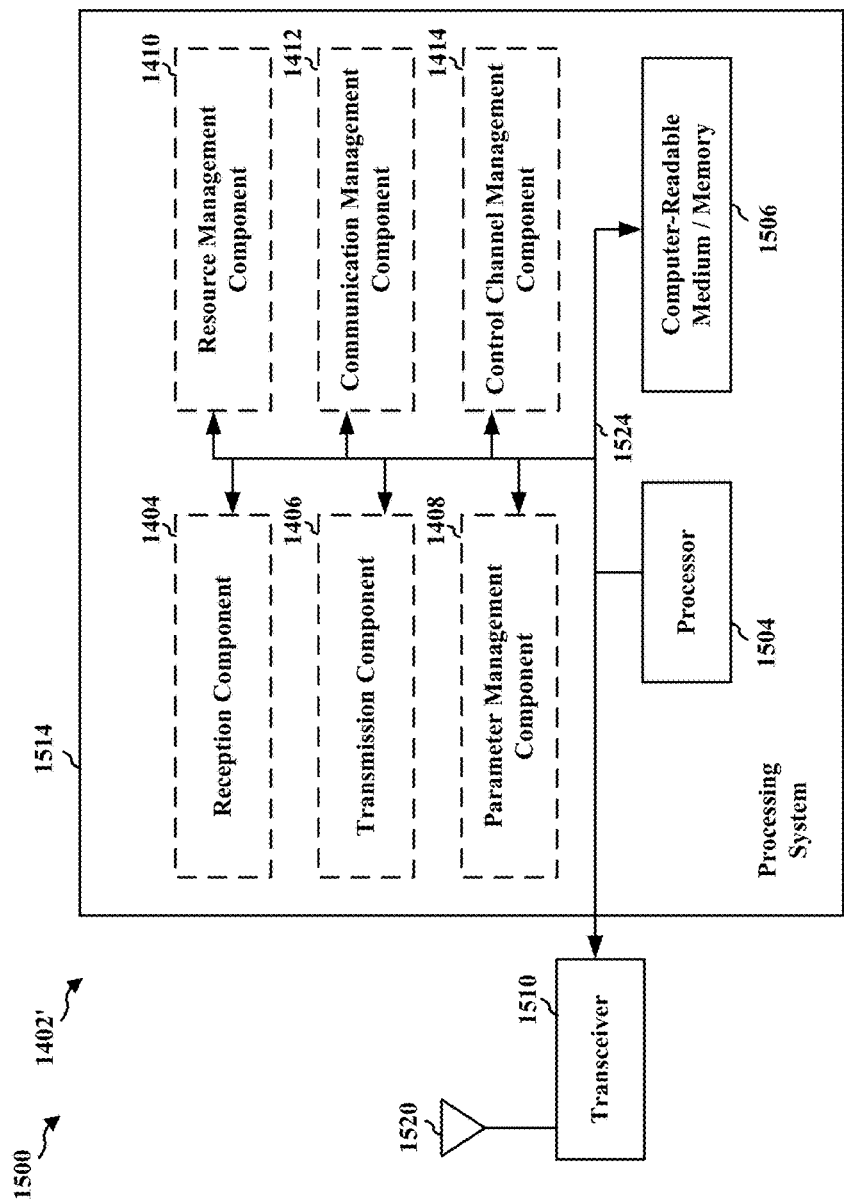
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414. The components may be software components running in the processor 1504, resident/stored in the computer readable medium/memory 1506, one or more hardware components coupled to the processor 1504, or some combination thereof. The processing system 1514 may be a component of the eNB 310 and may include the memory 376 and/or at least one of the TX processor 316, the RX processor 370, and the controller/processor 375.

In one configuration, the apparatus 1402/1402' for wireless communication includes means for determining parameter information of one or more parameters, means for selecting, based on the parameter information, synchronization resources from a plurality of candidate resources for transmission of one or more synchronization signals, where the selected synchronization resources correspond to the parameter information, and means for transmitting the one or more synchronization signals using the selected synchronization resources. In an aspect, the means for selecting the synchronization resources from the plurality of candidate resources is configured to select a number of guard subcarriers positioned between subcarrier resources for at least two of the one or more synchronization signals within the synchronization resources, where the number of guard subcarriers indicates the parameter information, where the synchronization resources are selected based on the number of guard subcarriers. In an aspect, the means for selecting the synchronization resources from the plurality of candidate resources is configured to select a distance between center frequencies of at least two of the one or more synchronization signals within the synchronization resources, where the synchronization resources are selected based on the distance between the center frequencies. In an aspect, the means for selecting the synchronization resources from the plurality of candidate resources is configured to determine a position of a subcarrier resource for at least one synchronization signal of the one or more synchronization signals within the synchronization resources, where the position of the subcarrier resource indicates the parameter information, where the synchronization resources are selected based on the subcarrier resource. In an aspect, the means for selecting the synchronization resources from the plurality of candidate resources is configured to determine an order of at least two of the one or more synchronization signals, where the order indicates the parameter information, where the synchronization resources are selected based on the order of the at least two of the one or more synchronization signals.

In another configuration, the apparatus 1402/1402' for wireless communication includes means for determining a CP duration parameter, and means for transmitting the CP duration parameter via a PBCH.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
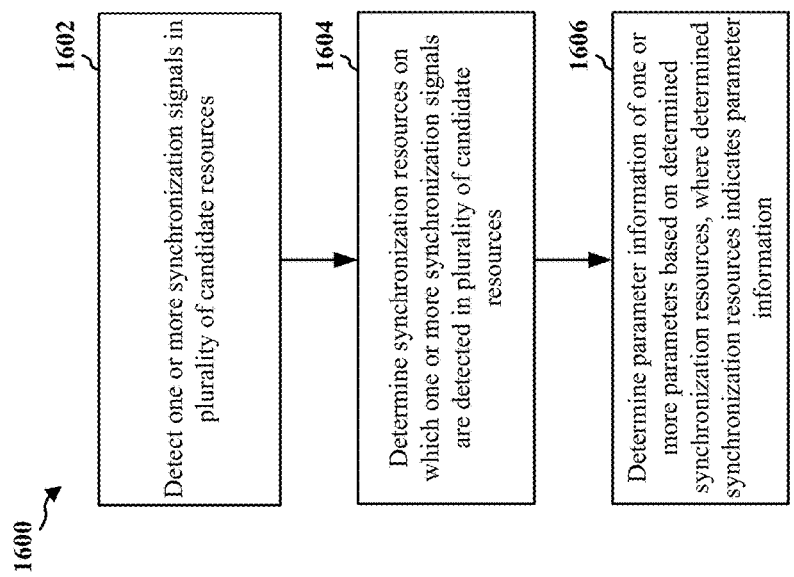
FIG. 16 is a flowchart of a method of wireless communication.

FIG. 16 is a flowchart 1600 of a method of wireless communication. The method may be performed by a UE (e.g., the UE 702, the apparatus 1802/1802'). At 1602, the UE detects a one or more synchronization signals in a plurality of candidate resources. For example, as discussed supra, the UE receives a signal transmitted from the base station, the UE may detect (e.g., by blind decoding) a signal on the candidate resources. In an aspect, the one or more synchronization signals include at least one of a PSS, an SSS, an ESS, a BRS, or a PBCH signal. For example, as discussed supra, the signal may include at least one synchronization signal such as a PSS, an SSS, an ESS, a BRS, and a PBCH signal. In an aspect, the one or more synchronization signals are transmitted via one or more mmW beams. For example, as discussed supra, when the base station transmits the signal (e.g., synchronization signal) using the selected resources, the base station may transmit the signal using one or more mmW beams, and may transmit the signal in a beam-sweeping manner, and thus the UE may receive the signal transmitted using one or more mmW beams.

At 1604, the UE determines synchronization resources on which the one or more synchronization signals are detected in the plurality of candidate resources. For example, as discussed supra, when the UE detects the signal, the UE may determine particular resources on which the UE detects the signal. At 1606, the UE determines parameter information of one or more parameters based on the determined synchronization resources, where the determined synchronization resources correspond to the parameter information. For example, as discussed supra, based on the particular resources on which the UE detects the signal, the UE may determine parameter information corresponding to the particular resources on which the UE detects the signal.

In an aspect, the UE may determine the parameter information of the one or more parameters by determining the parameter information based on a number of guard subcarriers positioned between subcarrier resources for transmitting at least two of the one or more synchronization signals within the synchronization resources, where the number of guard subcarriers indicates the parameter information. For example, as discussed supra, the UE detects the two synchronization signals in the resources carrying the two synchronization signals, the UE may determine the length of the guard subcarriers based on the resources, and may determine a parameter value corresponding to the length of the guard subcarriers. For example, as discussed supra, the UE may determine the length of the guard subcarriers based on locations of the resources on which the two synchronization signals are detected.

In an aspect, the UE may determine the parameter information of the one or more parameters by determining the parameter information based a distance between center frequencies of at least two of the one or more synchronization signals within the synchronization resources. For example, as discussed supra, the UE detects the two synchronization signals in the resources carrying the two synchronization signals, the UE may determine a distance between a center frequency of one synchronization signal and a center frequency of another synchronization signal based on the resources, and may determine a parameter value corresponding to the distance between the two center frequencies.

In an aspect, the UE may determine the parameter information of the one or more parameters by determining the parameter information based a position of a subcarrier resource for at least one synchronization signal of the one or more synchronization signals within the synchronization resources, where the position of the subcarrier resource indicates the parameter information. For example, as discussed supra, when the UE detects the synchronization signals in the subcarrier resources carrying the synchronization signal, the UE may determine a location of the subcarrier resources on which the synchronization signal is detected, and may determine a parameter value corresponding to the location of the subcarrier resources.

In an aspect, the UE may determine the parameter information of the one or more parameters by determining the parameter information based on an order of at least two of the one or more synchronization signals, where the order indicates the parameter information. For example, as discussed supra, the UE may detect the synchronization signals in candidate resources, may determine the order of the synchronization signals based on the order of reception of the synchronization signals, and may determine a particular parameter value that corresponds to the order of the synchronization signals.

In an aspect, the parameter information of the one or more parameters may include a parameter value of each of at least one of a CP duration parameter, a BRS transmission parameter, a duplex configuration parameter. For example, as discussed supra, one or more parameters whose values may be conveyed in the parameter information may include one or more of a CP duration parameter, a BRS transmission parameter, and a duplex configuration parameter. In such an aspect, the CP duration parameter may indicate whether an ECP is used or an NCP is used. For example, as discussed supra, the CP duration parameter may indicate either an ECP or an NCP, where a ECP duration (e.g., 10 microseconds) may be longer than an NCP duration (e.g., 6 microseconds). In such an aspect, the BRS transmission parameter includes at least one of an BRS transmission indicator or a BRS configuration parameter, the BRS transmission indicator indicating whether a BRS transmission is triggered or not and the BRS configuration parameter indicating a resource for transmission of a BRS. For example, as discussed supra, the BRS transmission parameter may indicate whether a BRS transmission is triggered or is not triggered, and/or may indicate which BRS configuration is used for BRS transmission. In such an aspect, the duplex configuration parameter may indicate whether a base station utilizes a TDD or an FDD. For example, as discussed supra, the duplex configuration parameter may indicate whether a cell served by the base station is operating in a TDD mode or in an FDD mode.

Figure 17:
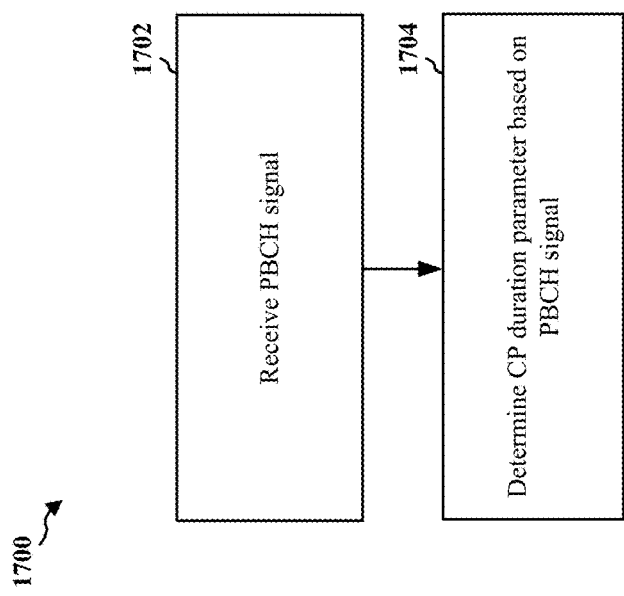
FIG. 17 is a flowchart of a method of wireless communication.

FIG. 17 is a flowchart 1700 of a method of wireless communication. The method may be performed by a UE (e.g., the UE 702, the apparatus 1802/1802'). At 1702, the UE receives a PBCH signal. At 1704, the UE determines a CP duration parameter based on the PBCH signal. For example, as discussed supra, when the UE receives a PBCH signal, the UE may determine the CP duration parameter value based on the information (e.g., one bit) in the PBCH signal. In an aspect, the CP duration parameter indicates whether an ECP is used or an NCP is used. For example, as discussed supra, one bit in the PBCH signal may be used to indicate whether the system utilizes an ECP or an NCP.

Figure 18:
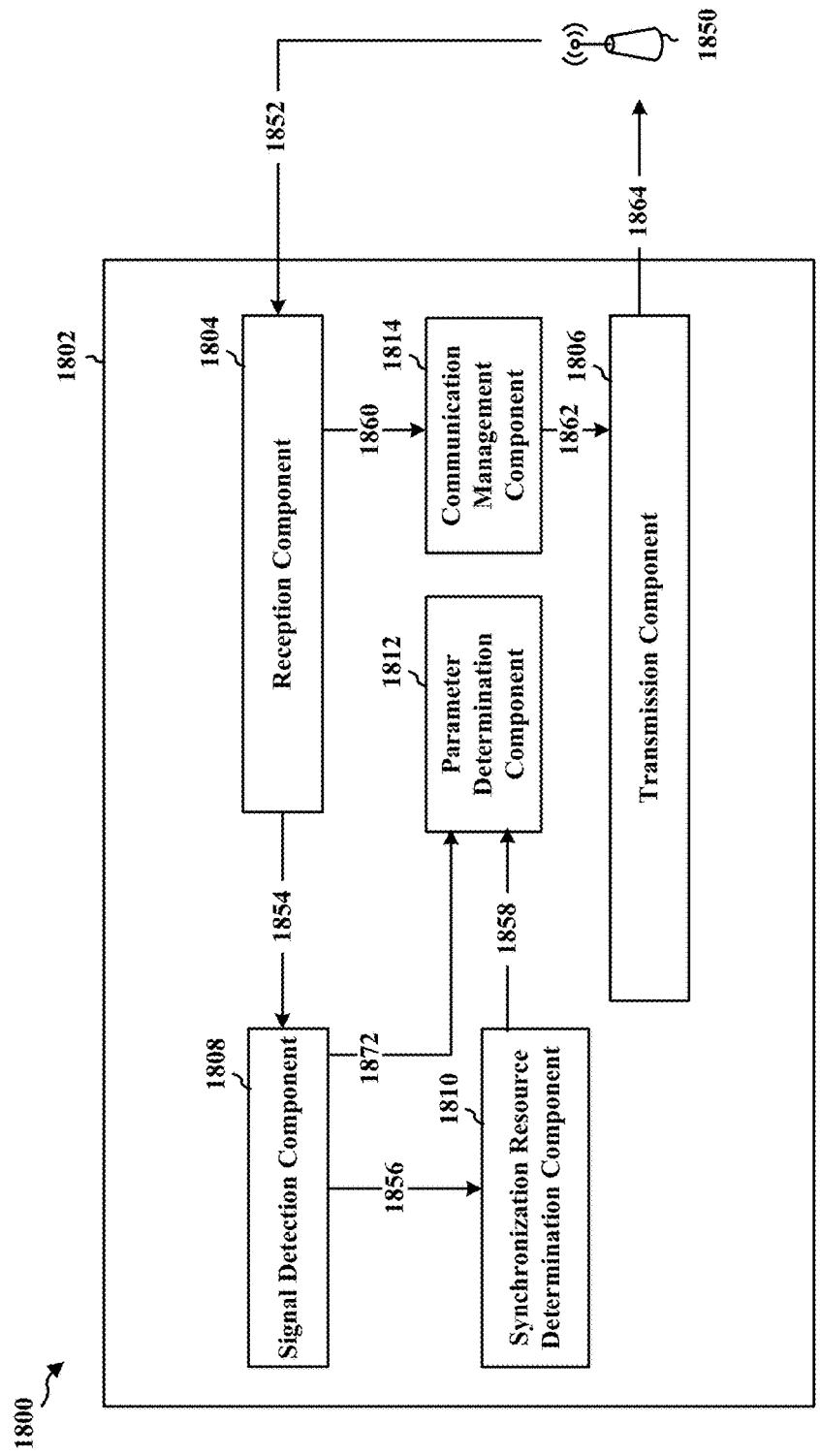
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a UE. The apparatus includes a reception component 1804, a transmission component 1806, a signal detection component 1808, a synchronization resource determination component 1810, a parameter determination component 1812, a communication management component 1814.

The signal detection component 1808 detects one or more synchronization signals in a plurality of candidate resources. The signal detection component 1808 may detect the one or more synchronization signals among signals received, via the reception component 1804, from a base station 1850, at 1852 and 1854. In an aspect, the one or more synchronization signals include at least one of a PSS, an SSS, an ESS, a BRS, or a PBCH signal. In an aspect, the one or more synchronization signals are transmitted via one or more mmW beams. The signal detection component 1808 may forward the results of the detection of the one or more synchronization signals to the synchronization resource determination component 1810, at 1856.

The synchronization resource determination component 1810 determines synchronization resources on which the one or more synchronization signals are detected in the plurality of candidate resources. The synchronization resource determination component 1810 may forward information about the determined synchronization resources to the parameter determination component 1812, at 1858.

The parameter determination component 1812 determines parameter information of one or more parameters based on the determined synchronization resources, where the determined synchronization resources correspond to the parameter information.

In an aspect, the parameter determination component 1812 may determine the parameter information of the one or more parameters by determining the parameter information based on a number of guard subcarriers positioned between subcarrier resources for transmitting at least two of the one or more synchronization signals within the synchronization resources, where the number of guard subcarriers indicates the parameter information. In an aspect, the parameter determination component 1812 may determine the parameter information of the one or more parameters by determining the parameter information based a distance between center frequencies of at least two of the one or more synchronization signals within the synchronization resources. In an aspect, the parameter determination component 1812 may determine the parameter information of the one or more parameters by determining the parameter information based a position of a subcarrier resource for at least one synchronization signal of the one or more synchronization signals within the synchronization resources, where the position of the subcarrier resource indicates the parameter information. In an aspect, the parameter determination component 1812 may determine the parameter information of the one or more parameters by determining the parameter information based on an order of at least two of the one or more synchronization signals, where the order indicates the parameter information.

In an aspect, the parameter information of the one or more parameters may include a parameter value of each of at least one of a CP duration parameter, a BRS transmission parameter, a duplex configuration parameter. In such an aspect, the CP duration parameter may indicate whether an ECP is used or an NCP is used. In such an aspect, the BRS transmission parameter includes at least one of an BRS transmission indicator or a BRS configuration parameter, the BRS transmission indicator indicating whether a BRS transmission is triggered or not and the BRS configuration parameter indicating a resource for transmission of a BRS. In such an aspect, the duplex configuration parameter may indicate whether a base station utilizes a TDD or an FDD.

In an aspect, the reception component 1804 may receive signals from the base station 1850, and forward the received signal to a communication management component 1860 to process the received signal. The communication management component 1814 may also transmit signals to the base station 1850 via the transmission component 1806, at 1862 and 1864.

According to another aspect of the disclosure, the signal detection component 1808 receives a PBCH signal, via the reception component 1804 (e.g., from the base station 1850), at 1852 and 1854. The signal detection component 1808 may forward the PBCH signal to the parameter determination component 1812, at 1872. The parameter determination component 1812 determines a CP duration parameter based on the PBCH signal. In an aspect, the CP duration parameter indicates whether an ECP is used or an NCP is used.

The apparatus may include additional components that perform each of the blocks of the algorithm in the aforementioned flowcharts of FIGS. 16 and 17. As such, each block in the aforementioned flowcharts of FIGS. 16 and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
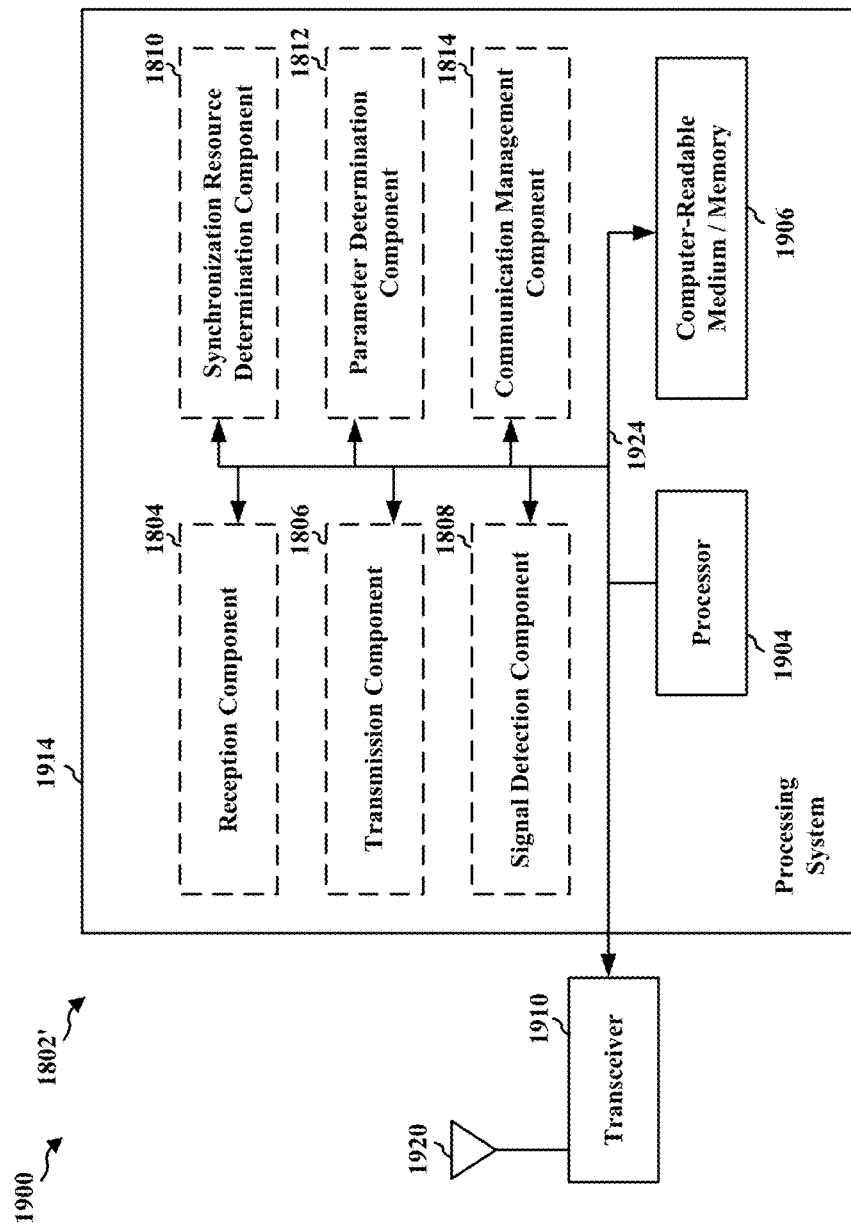
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1806, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 and/or at least one of the TX processor 368, the RX processor 356, and the controller/processor 359.

In one configuration, the apparatus 1802/1802' for wireless communication includes means for detecting a one or more synchronization signals in a plurality of candidate resources, means for determining synchronization resources on which the one or more synchronization signals are detected in the plurality of candidate resources, and means for determining parameter information of one or more parameters based on the determined synchronization resources, where the determined synchronization resources correspond to the parameter information. In an aspect, the means for determining the parameter information of the one or more parameters is configured to determine the parameter information based on a number of guard subcarriers positioned between subcarrier resources for transmitting at least two of the one or more synchronization signals within the synchronization resources, where the number of guard subcarriers indicates the parameter information. In an aspect, the means for determining the parameter information of the one or more parameters is configured to determine the parameter information based a distance between center frequencies of at least two of the one or more synchronization signals within the synchronization resources. In an aspect, the means for determining the parameter information of the one or more parameters is configured to determine the parameter information based a position of a subcarrier resource for at least one synchronization signal of the one or more synchronization signals within the synchronization resources, where the position of the subcarrier resource indicates the parameter information. In an aspect, the means for determining the parameter information of the one or more parameters is configured to determine the parameter information based on an order of at least two of the one or more synchronization signals, where the order indicates the parameter information.

In one configuration, the apparatus 1802/1802' for wireless communication includes means for receiving a PBCH signal, and means for determining a CP duration parameter based on the PBCH signal.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
   determining parameter information of one or more parameters;
   selecting, based on the parameter information, synchronization resources from a plurality of candidate resources for transmission of one or more synchronization signals, wherein the selected synchronization resources correspond to the parameter information; and
   transmitting the one or more synchronization signals using the selected synchronization resources.

2. The method of claim 1, wherein the parameter information of the one or more parameters includes a parameter value of a beam reference signal (BRS) transmission parameter.

3. The method of claim 1, wherein the parameter information of the one or more parameters includes a parameter value of a cyclic prefix (CP) duration parameter, wherein the CP duration parameter indicates whether an extended CP (ECP) is used or a normal CP (NCP) is used.

4. The method of claim 2, wherein the BRS transmission parameter includes at least one of a BRS transmission indicator or a BRS configuration parameter, the BRS transmission indicator indicating whether a BRS transmission is triggered or not and the BRS configuration parameter indicating a resource for transmission of a BRS.

5. The method of claim 1, wherein the parameter information of the one or more parameters includes a parameter value of a duplex configuration parameter, wherein the duplex configuration parameter indicates whether the base station utilizes a time division duplex (TDD) or a frequency division duplex (FDD).

6. The method of claim 1, wherein the selecting the synchronization resources from the plurality of candidate resources comprises:
   selecting a number of guard subcarriers positioned between subcarrier resources for at least two of the one or more synchronization signals within the synchronization resources, wherein the number of guard subcarriers indicates the parameter information,
   wherein the synchronization resources are selected based on the number of guard sub carriers.

7. The method of claim 1, wherein the selecting the synchronization resources from the plurality of candidate resources comprises:
   selecting a distance between center frequencies of at least two of the one or more synchronization signals within the synchronization resources,
   wherein the synchronization resources are selected based on the distance between the center frequencies.

8. The method of claim 1, wherein the selecting the synchronization resources from the plurality of candidate resources comprises:
   determining a position of a subcarrier resource for at least one synchronization signal of the one or more synchronization signals within the synchronization resources, wherein the position of the subcarrier resource indicates the parameter information,
   wherein the synchronization resources are selected based on the position of the subcarrier resource.

9. The method of claim 1, wherein the selecting the synchronization resources from the plurality of candidate resources comprises:
   determining an order of at least two of the one or more synchronization signals, wherein the order indicates the parameter information,
   wherein the synchronization resources are selected based on the order of the at least two of the one or more synchronization signals.

10. The method of claim 1, wherein the one or more synchronization signals include at least one of a primary synchronization signal (PSS), a secondary synchronization signal (SSS), an extended synchronization signal (ESS), a beam reference signal (BRS), or a physical broadcast channel (PBCH) signal.

11. The method of claim 1, wherein the one or more synchronization signals are transmitted via one or more millimeter wave (MMW) beams.

12. A method of wireless communication by a user equipment (UE), comprising:
   detecting one or more synchronization signals in a plurality of candidate resources;
   determining synchronization resources on which the one or more synchronization signals are detected in the plurality of candidate resources; and
   determining parameter information of one or more parameters based on the determined synchronization resources, wherein the determined synchronization resources correspond to the parameter information.

13. The method of claim 12, wherein the parameter information of the one or more parameters includes a parameter value of a beam reference signal (BRS) transmission parameter.

14. The method of claim 12, wherein the parameter information of the one or more parameters includes a parameter value of a cyclic prefix (CP) duration parameter, wherein the CP duration parameter indicates whether an extended CP (ECP) is used or a normal CP (NCP) is used.

15. The method of claim 13, wherein the BRS transmission parameter includes at least one of a BRS transmission indicator or a BRS configuration parameter, the BRS transmission indicator indicating whether a BRS transmission is triggered or not and the BRS configuration parameter indicating a resource for transmission of a BRS.

16. The method of claim 13, wherein the parameter information of the one or more parameters includes a parameter value of a duplex configuration parameter, wherein the duplex configuration parameter indicates whether a base station utilizes a time division duplex (TDD) or a frequency division duplex (FDD).

17. The method of claim 12, wherein the determining the parameter information of the one or more parameters comprises:
   determining the parameter information based on a number of guard subcarriers positioned between subcarrier resources for transmitting at least two of the one or more synchronization signals within the synchronization resources, wherein the number of guard subcarriers indicates the parameter information.

18. The method of claim 12, wherein the determining the parameter information of the one or more parameters comprises:
  determining the parameter information based a distance between center frequencies of at least two of the one or more synchronization signals within the synchronization resources.

19. The method of claim 12, wherein the determining the parameter information of the one or more parameters comprises:
  determining the parameter information based a position of a subcarrier resource for at least one synchronization signal of the one or more synchronization signals within the synchronization resources, wherein the position of the subcarrier resource indicates the parameter information.

20. The method of claim 12, wherein the determining the parameter information of the one or more parameters comprises:
  determining the parameter information based on an order of at least two of the one or more synchronization signals, wherein the order indicates the parameter information.

21. The method of claim 12, wherein the one or more synchronization signals include at least one of a primary synchronization signal (PSS), a secondary synchronization signal (SSS), an extended synchronization signal (ESS), a beam reference signal (BRS), or a physical broadcast channel (PBCH) signal.

22. The method of claim 12, wherein the one or more synchronization signals are transmitted via one or more millimeter wave (MMW) beams.

23. A base station for wireless communication, comprising:
  means for determining parameter information of one or more parameters;
  means for selecting, based on the parameter information, synchronization resources from a plurality of candidate resources for transmission of one or more synchronization signals, wherein the selected synchronization resources correspond to the parameter information; and
  means for transmitting the one or more synchronization signals using the selected synchronization resources.

24. The base station of claim 23, wherein the parameter information of the one or more parameters includes a beam reference signal (BRS) transmission parameter.

25. The base station of claim 23, wherein the parameter information of the one or more parameters includes a parameter value of a cyclic prefix (CP) duration parameter, wherein the CP duration parameter indicates whether an extended CP (ECP) is used or a normal CP (NCP) is used.

26. The base station of claim 24, wherein the BRS transmission parameter includes at least one of a BRS transmission indicator or a BRS configuration parameter, the BRS transmission indicator indicating whether a BRS transmission is triggered or not and the BRS configuration parameter indicating a resource for transmission of a BRS.

27. The base station of claim 23, wherein the parameter information of the one or more parameters includes a parameter value of a duplex configuration parameter, wherein the duplex configuration parameter indicates whether the base station utilizes a time division duplex (TDD) or a frequency division duplex (FDD).

28. The base station of claim 23, wherein the means for selecting the synchronization resources from the plurality of candidate resources is further configured to:
  select a number of guard subcarriers positioned between subcarrier resources for at least two of the one or more synchronization signals within the synchronization resources, wherein the number of guard subcarriers indicates the parameter information,
  wherein the synchronization resources are selected based on the number of guard sub carriers.

29. The base station of claim 23, wherein the means for selecting the synchronization resources from the plurality of candidate resources is further configured to:
  select a distance between center frequencies of at least two of the one or more synchronization signals within the synchronization resources,
  wherein the synchronization resources are selected based on the distance between the center frequencies.

30. The base station of claim 23, wherein the means for selecting the synchronization resources from the plurality of candidate resources is further configured to:
  determine a position of a subcarrier resource for at least one synchronization signal of the one or more synchronization signals within the synchronization resources, wherein the position of the subcarrier resource indicates the parameter information,
  wherein the synchronization resources are selected based on the position of the subcarrier resource.

31. The base station of claim 23, wherein the means for selecting the synchronization resources from the plurality of candidate resources is further configured to:
  determine an order of at least two of the one or more synchronization signals, wherein the order indicates the parameter information,
  wherein the synchronization resources are selected based on the order of the at least two of the one or more synchronization signals.

32. The base station of claim 23, wherein the one or more synchronization signals include at least one of a primary synchronization signal (PSS), a secondary synchronization signal (SSS), an extended synchronization signal (ESS), a beam reference signal (BRS), or a physical broadcast channel (PBCH) signal.

33. The base station of claim 23, wherein the one or more synchronization signals are transmitted via one or more millimeter wave (MMW) beams.

34. A user equipment (UE) for wireless communication, comprising:
  means for detecting a one or more synchronization signals in a plurality of candidate resources;
  means for determining synchronization resources on which the one or more synchronization signals are detected in the plurality of candidate resources; and
  means for determining parameter information of one or more parameters based on the determined synchronization resources, wherein the determined synchronization resources correspond to the parameter information.

35. The UE of claim 34, wherein the parameter information of the one or more parameters includes a parameter value of a beam reference signal (BRS) transmission parameter.

36. The UE of claim 34, wherein the parameter information of the one or more parameters includes a parameter value of a cyclic prefix (CP) duration parameter, wherein the CP duration parameter indicates whether an extended CP (ECP) is used or a normal CP (NCP) is used.

37. The UE of claim 35, wherein the BRS transmission parameter includes at least one of a BRS transmission indicator or a BRS configuration parameter, the BRS transmission indicator indicating whether a BRS transmission is triggered or not and the BRS configuration parameter indicating a resource for transmission of a BRS.

38. The UE of claim 34, wherein the parameter information of the one or more parameters includes a parameter value of a duplex configuration parameter, wherein the duplex configuration parameter indicates whether a base station utilizes a time division duplex (TDD) or a frequency division duplex (FDD).

39. The UE of claim 34, wherein the means for determining the parameter information of the one or more parameters is further configured to:
determine the parameter information based on a number of guard subcarriers positioned between subcarrier resources for transmitting at least two of the one or more synchronization signals within the synchronization resources, wherein the number of guard subcarrier indicates the parameter information.

40. The UE of claim 34, wherein the means for determining the parameter information of the one or more parameters is further configured to:
determine the parameter information based a distance between center frequencies of at least two of the one or more synchronization signals within the synchronization resources.

41. The UE of claim 34, wherein the means for determining the parameter information of the one or more parameters is further configured to:
determine the parameter information based a position of a subcarrier resource for at least one synchronization signal of the one or more synchronization signals within the synchronization resources, wherein the position of the subcarrier resource indicates the parameter information.

42. The UE of claim 34, wherein the means for determining the parameter information of the one or more parameters is further configured to:
determine the parameter information based on an order of at least two of the one or more synchronization signals, wherein the order indicates the parameter information.

43. The UE of claim 34, wherein the one or more synchronization signals include at least one of a primary synchronization signal (PSS), a secondary synchronization signal (SSS), an extended synchronization signal (ESS), a beam reference signal (BRS), or a physical broadcast channel (PBCH) signal.

44. The UE of claim 34, wherein the one or more synchronization signals are transmitted via one or more millimeter wave (MMW) beams.

45. A base station for wireless communication, comprising:
a memory; and
at least one processor coupled to the memory and configured to:
determine parameter information of one or more parameters;
select, based on the parameter information, synchronization resources from a plurality of candidate resources for transmission of one or more synchronization signals, wherein the selected synchronization resources correspond to the parameter information; and
transmit the one or more synchronization signals using the selected synchronization resources.

46. The base station of claim 45, wherein the parameter information of the one or more parameters includes a beam reference signal (BRS) transmission parameter.

47. The base station of claim 45, wherein the parameter information of the one or more parameters includes a parameter value of a cyclic prefix (CP) duration parameter, wherein the CP duration parameter indicates whether an extended CP (ECP) is used or a normal CP (NCP) is used.

48. The base station of claim 46, wherein the BRS transmission parameter includes at least one of a BRS transmission indicator or a BRS configuration parameter, the BRS transmission indicator indicating whether a BRS transmission is triggered or not and the BRS configuration parameter indicating a resource for transmission of a BRS.

49. The base station of claim 47, wherein the parameter information of the one or more parameters includes a parameter value of a duplex configuration parameter, wherein the duplex configuration parameter indicates whether the base station utilizes a time division duplex (TDD) or a frequency division duplex (FDD).

50. The base station of claim 45, wherein the at least one processor configured to select the synchronization resources from the plurality of candidate resources is configured to:
select a number of guard subcarriers positioned between subcarrier resources for at least two of the one or more synchronization signals within the synchronization resources, wherein the number of guard subcarriers indicates the parameter information,
wherein the synchronization resources are selected based on the number of guard sub carriers.

51. The base station of claim 45, wherein the at least one processor configured to select the synchronization resources from the plurality of candidate resources is configured to:
select a distance between center frequencies of at least two of the one or more synchronization signals within the synchronization resources,
wherein the synchronization resources are selected based on the distance between the center frequencies.

52. The base station of claim 45, wherein the at least one processor configured to select the synchronization resources from the plurality of candidate resources is further configured to:
determine a position of a subcarrier resource for at least one synchronization signal of the one or more synchronization signals within the synchronization resources, wherein the position of the subcarrier resource indicates the parameter information,
wherein the synchronization resources are selected based on the position of the subcarrier resource.

53. The base station of claim 45, wherein the at least one processor configured to select the synchronization resources from the plurality of candidate resources is configured to:
determine an order of at least two of the one or more synchronization signals, wherein the order indicates the parameter information,
wherein the synchronization resources are selected based on the order of the at least two of the one or more synchronization signals.

54. The base station of claim 45, wherein the one or more synchronization signals include at least one of a primary synchronization signal (PSS), a secondary synchronization signal (SSS), an extended synchronization signal (ESS), a beam reference signal (BRS), or a physical broadcast channel (PBCH) signal.

55. The base station of claim 45, wherein the one or more synchronization signals are transmitted via one or more millimeter wave (MMW) beams.

56. A user equipment (UE) for wireless communication, comprising:
a memory; and
at least one processor coupled to the memory and configured to:
detect one or more synchronization signals in a plurality of candidate resources;
determine synchronization resources on which the one or more synchronization signals are detected in the plurality of candidate resources; and
determine parameter information of one or more parameters based on the determined synchronization resources, wherein the determined synchronization resources correspond to the parameter information.

57. The UE of claim 56, wherein the parameter information of the one or more parameters includes a parameter value of a beam reference signal (BRS) transmission parameter.

58. The UE of claim 56, wherein the parameter information of the one or more parameters includes a parameter value of a cyclic prefix (CP) duration parameter, wherein the CP duration parameter indicates whether an extended CP (ECP) is used or a normal CP (NCP) is used.

59. The UE of claim 56, wherein the BRS transmission parameter includes at least one of a BRS transmission indicator or a BRS configuration parameter, the BRS transmission indicator indicating whether a BRS transmission is triggered or not and the BRS configuration parameter indicating a resource for transmission of a BRS.

60. The UE of claim 56, wherein the parameter information of the one or more parameters includes a parameter value of a duplex configuration parameter, wherein the duplex configuration parameter indicates whether a base station utilizes a time division duplex (TDD) or a frequency division duplex (FDD).

61. The UE of claim 56, wherein the at least one processor configured to determine the parameter information of the one or more parameters is further configured to:
determine the parameter information based on a number of guard subcarriers positioned between subcarrier resources for transmitting at least two of the one or more synchronization signals within the synchronization resources, wherein the number of guard subcarriers indicates the parameter information.

62. The UE of claim 56, wherein the at least one processor configured to determine the parameter information of the one or more parameters is further configured to:
determine the parameter information based a distance between center frequencies of at least two of the one or more synchronization signals within the synchronization resources.

63. The UE of claim 56, wherein the at least one processor configured to determine the parameter information of the one or more parameters is further configured to:
determine the parameter information based a position of a subcarrier resource for at least one synchronization signal of the one or more synchronization signals within the synchronization resources, wherein the position of the subcarrier resource indicates the parameter information.

64. The UE of claim 56, wherein the at least one processor configured to determine the parameter information of the one or more parameters is further configured to:
determine the parameter information based on an order of at least two of the one or more synchronization signals, wherein the order indicates the parameter information.

65. The UE of claim 56, wherein the one or more synchronization signals include at least one of a primary synchronization signal (PSS), a secondary synchronization signal (SSS), an extended synchronization signal (ESS), a beam reference signal (BRS), or a physical broadcast channel (PBCH) signal.

66. The UE of claim 56, wherein the one or more synchronization signals are transmitted via one or more millimeter wave (MMW) beams.

67. A non-transitory computer-readable medium storing computer executable code for a base station which when executed by a processor, causes the processor to:
determine parameter information of one or more parameters;
select, based on the parameter information, synchronization resources from a plurality of candidate resources for transmission of one or more synchronization signals, wherein the selected synchronization resources correspond to the parameter information; and
transmit the one or more synchronization signals using the selected synchronization resources.

68. A non-transitory computer-readable medium storing computer executable code for a user equipment (UE) which when executed by a processor, causes the processor to:
detect one or more synchronization signals in a plurality of candidate resources;
determine synchronization resources on which the one or more synchronization signals are detected in the plurality of candidate resources; and
determine parameter information of one or more parameters based on the determined synchronization resources, wherein the determined synchronization resources correspond to the parameter information.

* * * * *